(12) United States Patent
Inomori et al.

(10) Patent No.: US 8,037,985 B2
(45) Date of Patent: Oct. 18, 2011

(54) MOTORCYCLE INCLUDING CENTRIFUGAL CLUTCH

(75) Inventors: Toshinori Inomori, Shizuoka (JP);
Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 453 days.

(21) Appl. No.: 12/392,791

(22) Filed: Feb. 25, 2009

(65) Prior Publication Data
US 2009/0211868 A1    Aug. 27, 2009

(30) Foreign Application Priority Data
Feb. 25, 2008    (JP) ................... 2008-043509

(51) Int. Cl.
*F16D 43/12*    (2006.01)
(52) U.S. Cl. ................ 192/35; 192/83; 192/105 B
(58) Field of Classification Search ............... 192/103 A, 192/83, 35, 105 B, 70.23, 85.5
See application file for complete search history.

(56) References Cited

U.S. PATENT DOCUMENTS

| 7,014,026 B2 * | 3/2006 | Drussel et al. ............ 192/105 B |
| 7,963,381 B2 * | 6/2011 | Inomori et al. ............ 192/105 B |
| 2009/0127057 A1 * | 5/2009 | Inomori et al. ............ 192/70.18 |
| 2009/0211864 A1 * | 8/2009 | Inomori et al. .................. 192/45 |
| 2010/0089679 A1 * | 4/2010 | Inomori et al. ............... 180/219 |

FOREIGN PATENT DOCUMENTS

| JP | 2003322177 A | * | 11/2003 |
| JP | 2004125059 A | * | 4/2004 |

OTHER PUBLICATIONS

JP 2002021879 A—Japanese Laid-Open Patent Application Publication with English Abstract and English Machine Translation, Jan. 23, 2002, Yamaha Motor Co. Ltd.

* cited by examiner

*Primary Examiner* — David D Le
*Assistant Examiner* — Lillian Nguyen
(74) *Attorney, Agent, or Firm* — Dickstein Shapiro LLP

(57) ABSTRACT

A centrifugal clutch for an engine includes a pressure plate that presses a friction plate into a clutch plate is provided. The clutch may include a plurality of roller weights that move on respective cam surfaces in a radially outward direction relative to the pressure plate in accordance with the magnitude of a centrifugal force generated by rotation of a drive side rotating body. The pressure plate presses the friction plate into the clutch plate with a force corresponding to the amount of movement. An elastic member is operatively coupled to the pressure plate to cause the friction and clutch plates to stay in pressed contact even when the engine is in a stopped state.

15 Claims, 12 Drawing Sheets

MOTORCYCLE INCLUDING CENTRIFUGAL CLUTCH

PRIORITY INFORMATION

This patent application is based on and claims priority under 35 U.S.C. §119 to Japanese Patent Application No. 2008-043509, filed on Feb. 25, 2008, the entire contents of which is hereby expressly incorporated by reference.

TECHNICAL FIELD

The present invention relates to a motorcycle including a centrifugal clutch.

BACKGROUND ART

Japanese Laid-Open Patent Application Publication 2002-021879 discloses a multi-plate centrifugal clutch in which the clutch plates are in a contact state even when the engine is in a stopped state. The multi-plate centrifugal clutch described in Japanese Laid-Open Patent Application Publication 2002-021879 includes centrifugal weights, a pressure plate, and clutch plates (a first plate and a second plate). Contact surfaces of the respective pressure plate and clutch plate are parallel to each other, and the pressure plate presses the clutch plate by using the centrifugal force of the centrifugal weights. Further, in the pressure plate, cam surfaces holding the respective centrifugal weights are provided so that each of the cam surfaces is at an angle with a contact surface between the pressure plate and the clutch plate. More specifically, the pressing force exerted by the pressure plate against the clutch plate is determined depending on the positions of the cam surfaces of the respective centrifugal weights that have received the centrifugal force on the cam surfaces.

The multi-plate centrifugal clutch described in Japanese Laid-Open Patent Application Publication 2002-021879 is configured so that the centrifugal weights do not make contact with the pressure plate when the engine is in a stopped state. In the case where the centrifugal weights are in contact with the pressure plate, there would be contact between the pressure plate and the clutch plate. In the case where the pressure plate and the clutch plate are in contact with each other, there occurs a drag state, which is similar to the engaged state of the clutch. In the case of a motorcycle using such a multi-plate centrifugal clutch causing the drag state, there arises a problem in which a travel resistance occurs if the motorcycle with the engine in the stopped state is pushed and moved. Hence, in the multi-plate centrifugal clutch described in Japanese Laid-Open Patent Application Publication 2002-021879, the cam surfaces provided on the pressure plate are each formed into such a shape that the centrifugal weights separate a predetermined distance from the pressure plate when the engine is in a stopped state.

However, in the case of the motorcycle including the multi-plate centrifugal clutch described in Japanese Laid-Open Patent Application Publication 2002-021879, while the drag state of the clutch is prevented, a situation can arise when parking the motorcycle, for example, on a sloped road, in which the motorcycle resistance against the sloped road is insufficient to prevent the motorcycle from rolling.

Further, in the case where the motorcycle according to the Japanese Laid-Open Patent Application Publication 2002-021879 includes an auto-controlled gear transmission, i.e., a so-called AMT (automated manual transmission), when the engine of the motorcycle is in the stopped state, the driving state is shifted to the neutral position, that is, the gear input operation is not effected. Hence, in the case where the motorcycle according to Japanese Laid-Open Patent Application Publication 2002-021879 is a motorcycle including the AMT, the motorcycle cannot be parked stably when parking, for example, on a sloped road. Hence, in the case where the motorcycle according to Japanese Laid-Open Patent Application Publication 2002-021879 includes the AMT, dedicated brake means is necessary to park the motorcycle stably on a sloped road. On the other hand, however, in the case where the motorcycle according to Japanese Laid-Open Patent Application Publication 2002-021879 is a motorcycle in which the dedicated brake means is not provided, application of the transmission including the clutch according to Japanese Laid-Open Patent Application Publication 2002-021879 is limited to motorcycles including a gear transmission that is not controlled automatically, i.e., a so-called MT (manual transmission).

SUMMARY

The present invention was made in view of the above-described issues, and an object the invention is to provide a centrifugal clutch enabling stable parking on a sloped road only by carrying out a gear input operation without using a parking brake, and a motorcycle including the centrifugal clutch.

In one aspect, the present invention is directed to a motorcycle including a centrifugal clutch working as means that transmits a drive force generated by an engine. The centrifugal clutch includes a clutch operator that causes engagement or disengagement of the centrifugal clutch; a drive side rotating body including a first plate; a driven side rotating body including a second plate disposed opposite to the first plate in a predetermined direction; a pressure plate that rotates with the drive side rotating body and that moves in the predetermined direction, thereby causing the first plate and the second plate to make contact with each other; and a centrifugal weight that moves to a radially outer side of the pressure plate by an amount of movement corresponding to a magnitude of a centrifugal force to thereby press the pressure plate in a direction causing the first plate and the second plate to make contact with each other by a force corresponding to the amount of movement. The pressure plate causes the first plate and the second plate to come into contact with each other even when the engine is in a stopped state so that part of the torque of the drive side rotating body is transmitted from the first plate to the driven side rotating body via the second plate.

According to the above, the pressure plate causes the first plate and the second plate to make contact with each other even when the engine is in a stopped state. Consequently, in the centrifugal clutch, torque can be transmitted even when the engine is in a stopped state.

As described above, according to the present invention, there can be provided a centrifugal clutch that enables stable parking on a sloped road only by carrying out a gear input operation without using a parking brake, and a motorcycle including the centrifugal clutch.

DETAILED DESCRIPTION

A motorcycle including a centrifugal clutch according to an embodiment will be described in detail below with reference to the drawings. However, the motorcycle 1 described below is simply a preferred example for carrying out the present invention. A motorcycle of the present invention is not limited to the motorcycle 1 described herebelow. In the present specification, the term "motorcycle" refers to a vehicle of the type whose vehicle body is designed to be tilted when making a turn. Accordingly, the term "motorcycle" as used herein is not limited to a vehicle including two wheels but may also include vehicles including three or more wheels.

Figure 1:
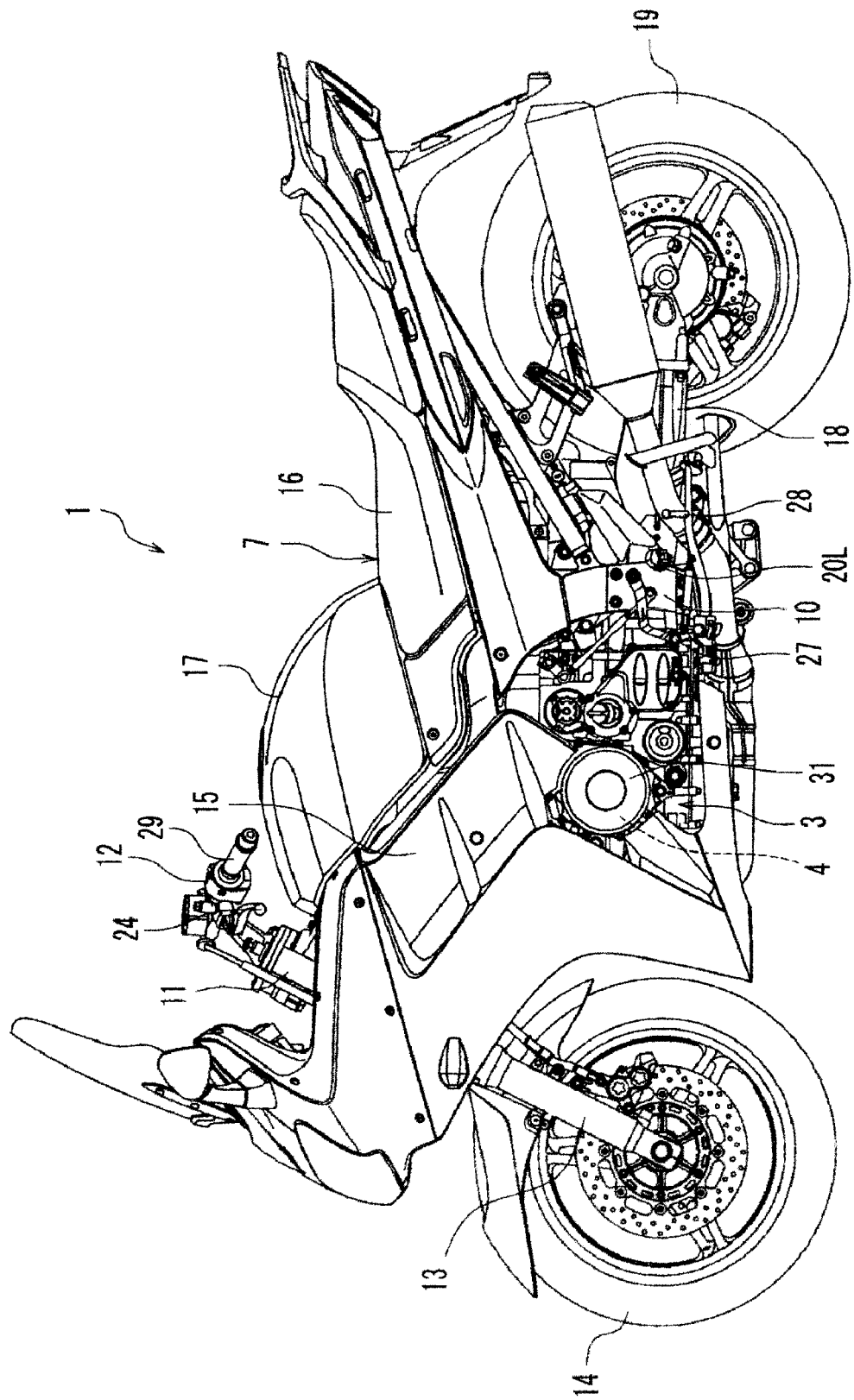
FIG. 1 is a side view of a motorcycle.

FIG. 1 is a left side view of a motorcycle 1 according to an embodiment. In the description below, the front-rear and left-right directions refer to directions as viewed from a rider occupying a seat 16 of motorcycle 1 described below.

Configuration of Motorcycle

As shown in FIG. 1, motorcycle 1 includes a vehicle body 7, a front wheel 14 provided at a front section of the vehicle body 7, and a rear wheel 19 provided at a rear section of the vehicle body 7.

The vehicle body 7 includes a vehicle body frame 10. The vehicle body frame 10 includes a head pipe 11. A handlebar 12 is provided to an upper end portion of the head pipe 11. In addition, the front wheel 14 is rotatably mounted to a lower end of the head pipe 11 via a front fork 13.

A power unit 3 is suspended from the vehicle body frame 10. In addition, a vehicle body cover 15 is mounted to the vehicle body frame 10. A seat 16 is disposed so as to extend rearward from a substantially central position of the vehicle body 7 to the rear side thereof in the front-rear direction. A fuel tank 17 is disposed in front of the seat 16.

A rear arm 18 is pivotally supported on the vehicle body frame 10. The rear wheel 19, which serves as a drive wheel, is rotatably mounted to a rear end of the rear arm 18. The rear wheel 19 is connected to an engine 4 (see FIG. 2) through a power transmission mechanism (not shown). Thereby, the power from the engine 4 is transmitted to the rear wheel 19 so that the rear wheel 19 rotates.

An accelerator grip (not shown) is provided on the right side of the handlebar 12. A left grip 29 is provided on the left side of the handlebar 12. A clutch lever 24 that is operated to engage/disengage friction clutch 2 (see FIG. 2), which is described later, is provided in front of the left grip 29 of the handlebar 12.

Footrests 20L are provided on each side of the vehicle body 7 at a central portion thereof in the front-rear direction. A shift pedal 27 is operated to change the transmission gear ratio of a transmission 5 (see FIG. 2), which will be described below, is provided on the left side of the vehicle body 7 at a position slightly in front of the left footrest 20L. A side stand 28 is provided on the left side of the vehicle body 7 at a position below the shift pedal 27 and the footrest 20L.

Configuration of Power Unit

Figure 2:
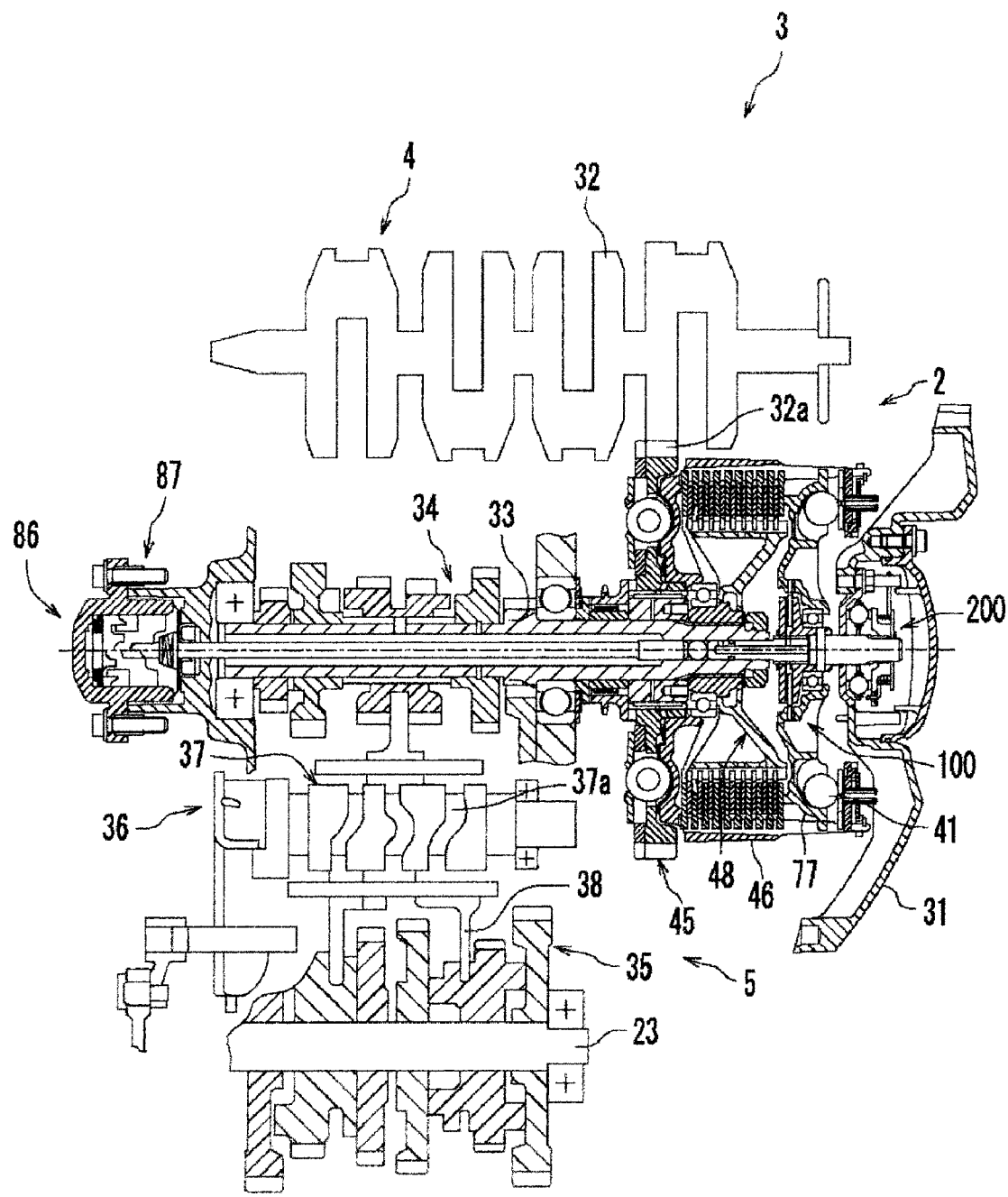
FIG. 2 is a schematic view of the main components of a power unit of the motorcycle of FIG. 1.

The configurations of the main components of the power unit 3 of motorcycle 1 will now be described with reference to FIG. 2. As shown in FIG. 2, the power unit 3 includes the engine 4, the transmission 5, and the clutch 2. In the present embodiment, while the type of the engine 4 is not limited to a particular type of engine, a water-cooled, four-cycle, parallel four-cylinder engine is used as the engine 4.

Although not shown, the engine 4 includes four cylinders, a piston reciprocating in each of the respective cylinders, and a crankshaft 32 connected to each of the respective pistons via a connecting rod. The crankshaft 32 extends in the vehicle width direction. Reference numeral 31 denotes a crankcase.

As shown in FIG. 2, the crankshaft 32 is connected to the transmission 5 via the clutch 2. The transmission 5 includes a main shaft 33, a drive shaft 23, and a gear selection mechanism 36. The main shaft 33 is connected to the crankshaft 32 via the clutch 2. The main shaft 33 and the drive shaft 23 are disposed parallel to each other and the crankshaft 32, respectively.

A plurality of multi-stage transmission gears 34 are mounted on the main shaft 33. In addition, a plurality of transmission gears 35 corresponding to the multi-stage transmission gears 34 are mounted on the drive shaft 23. The multi-stage transmission gears 34 and the plurality of transmission gears 35 are disposed so that only one pair of selected gears is engaged with each other. Either the transmission gears 34 excluding the selected transmission gear 34 or the transmission gears 35 excluding the selected transmission gear 35 are rotatable with respect to the main shaft 33 or the drive shaft 23 or both. That is, at least one of the non-selected transmission gears 34 or the non-selected transmission gears 35 run idle with respect to the main shaft 33 or the drive shaft 23. In other words, rotation is transmitted between the main shaft 33 and the drive shaft 23 only through the selected transmission gear 34 and the selected transmission gear 35 which are engaged with each other.

Selection of the transmission gears 34 and 35 is effected by the gear selection mechanism 36. Specifically, selection of the transmission gears 34 and 35 is effected by a shift cam 37 of the gear selection mechanism 36. A plurality of cam grooves 37a is formed on an outer circumferential surface of the shift cam 37. A shift fork 38 is engaged with each cam groove 37a. Each shift fork 38 is engaged with predetermined transmission gears 34 and 35 of the main shaft 33 and the drive shaft 23, respectively. As the shift cam 37 rotates, the plurality of shift forks 38 are guided in their respective cam grooves 37a to move in a direction of the main shaft 33, so that gears to be engaged with each other are selected from among the transmission gears 34 and 35. Specifically, among the multi-stage transmission gears 34 and the plurality of transmission gears 35, only one pair of gears disposed at positions corresponding to the rotational angle of the shift cam 37 are fixed with respect to the main shaft 38 and the drive shaft 23 by a spline. Thereby, the transmission gear position is determined, and rotation between the main shaft 33 and the drive shaft 23 is transmitted at a predetermined transmission gear ratio through the transmission gears 34 and 35. The gear selection mechanism 36 is operated by the shift pedal 27 shown in FIG. 1.

With this configuration, after a pair of transmission gears 34 and 35 is fixed to the main shaft 33 and the drive shaft 23 and the clutch 2 is engaged, when the engine 4 is driven a drive force of the engine 4 is transmitted to the main shaft 33 through the clutch 2. Further, the rotation is transmitted at a predetermined transmission gear ratio between the main shaft 33 and the drive shaft 23 via the predetermined pair of transmission gears 34 and 35, so that the drive shaft 23 is rotationally driven. When the drive shaft 23 is rotationally driven, a drive force is transmitted by a transmission mechanism (not shown), such as a chain connecting the drive shaft 23 and the rear wheel 19, so that the rear wheel 19 is rotated. In the present embodiment, a power transmission mechanism interconnecting the engine 4 and the rear wheel 19 is configured to include, for example, clutch 2, the transmission 5, and a transmission mechanism (not shown), such as a chain.

Configuration of Clutch

Figure 3:
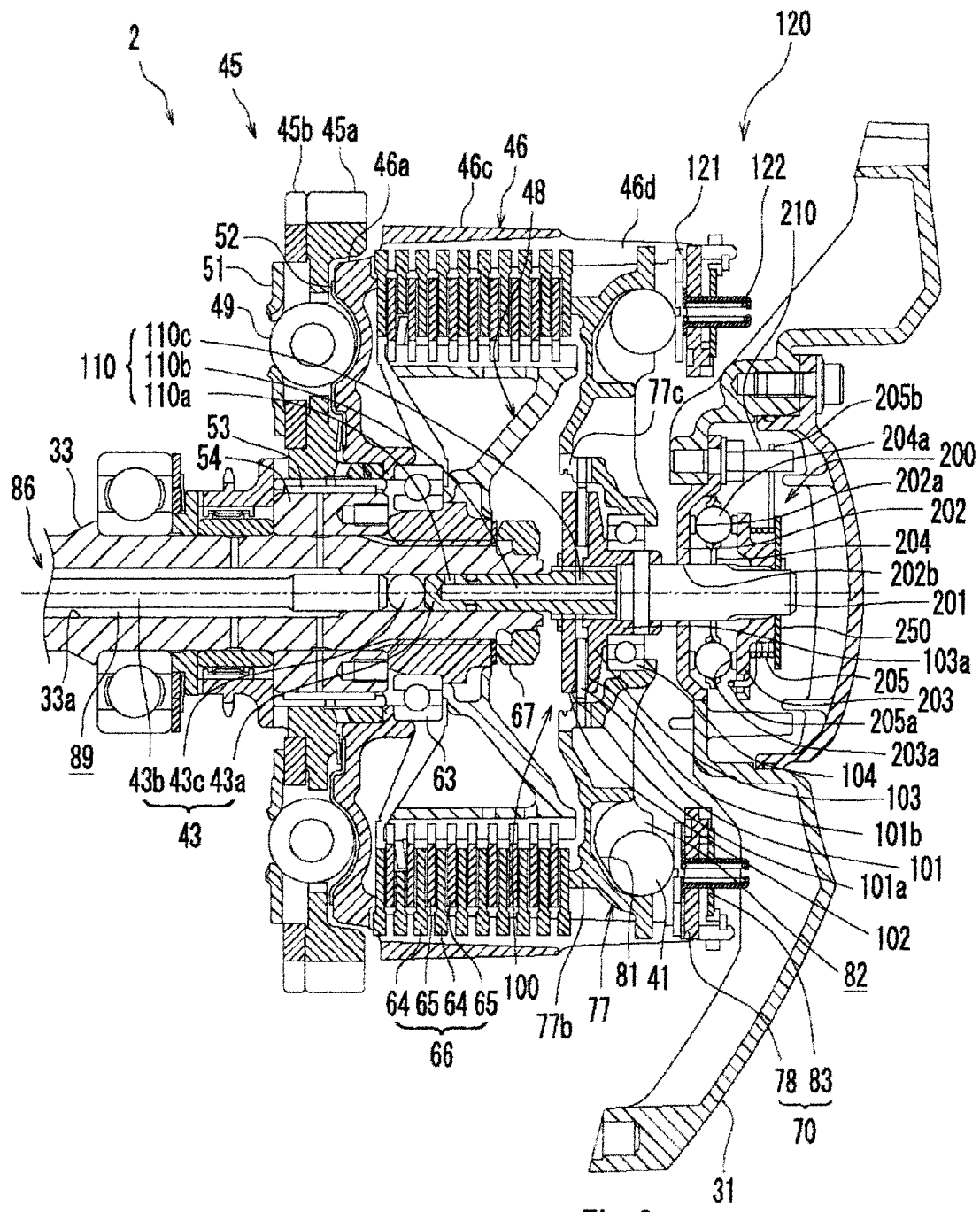
FIG. 3 is a cross-sectional view of a clutch of the motorcycle of FIG. 1.
Figure 4:
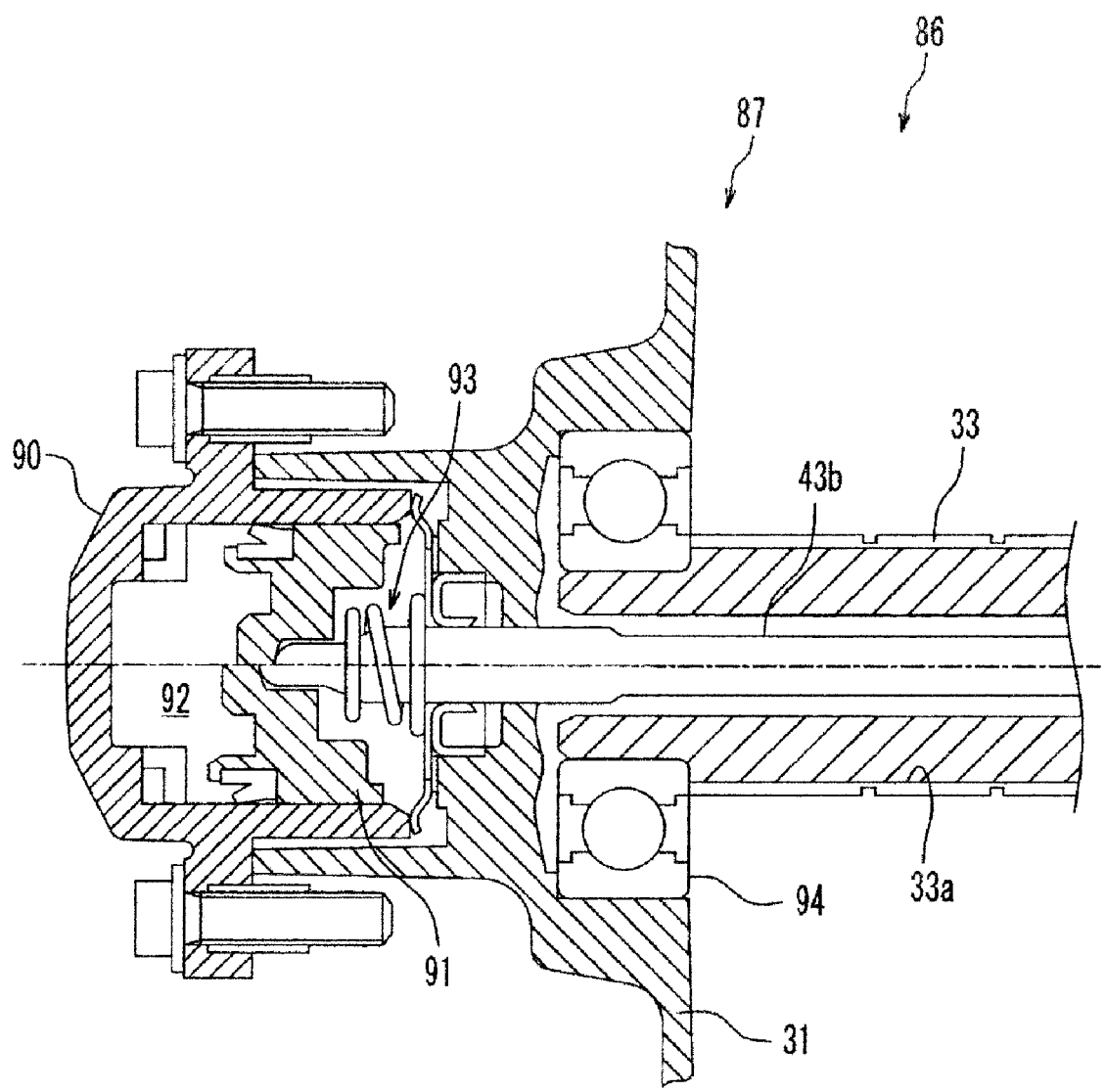
FIG. 4 is a cross-sectional view of a pushrod drive mechanism that may be used to disengage the clutch.

In the present embodiment, the clutch 2 comprises a friction clutch of the wet multi-plate type. Further, the clutch 2 is a centrifugal clutch that is automatically engaged or disengaged at the time of starting or stopping, and which is optionally engaged or disengaged through the operation of the clutch lever 24 by a rider. With reference to FIGS. 2 to 4, the configuration of the clutch 2 will be described below in detail.

Clutch Housing 46

As shown in FIG. 3, the clutch 2 includes a clutch housing 46. The main shaft 33 extends through the clutch housing 46. The clutch housing 46 includes a housing body 46c. The housing body 46c is formed in a substantially cylindrical form that is closed at one end by a bottom 46a. The main shaft 33 also extends through the bottom 46a of the housing body 46c. A plurality of pairs of arms 46d are provided on the housing body 46c. Each arm of the 46d extends outward in the vehicle width direction from the bottom 46a.

As shown in FIG. 2 and 3, the vehicle width direction is the left-right or lateral direction. In the present embodiment, the clutch 2 is disposed on the right side of the main shaft 33 such that the "outside" in the vehicle width direction corresponds to the right side, and the "inside" in the vehicle width direction corresponds to the left side. Therefore, the "outside" and the "inside" in the vehicle width direction will be referred to simply as the right side and the left side, respectively.

Scissor Gear 45

A scissor gear 45 is mounted to the clutch housing 46. The scissor gear 45 includes two gears 45a and 45b, a spring 49, and two plates 51 and 52. The gear 45a and the gear 45b are located between the two plates 51 and 52. The two plates 51 and 52 are fixed to each other with fasteners, such as rivets and screws, in the axial direction of the main shaft 33. Therefore, the two gears 45a and 45b are substantially fixed to each other with respect to the axial direction of the main shaft 33. Meanwhile, the gears 45a and 45b are rotatable relative to each other with respect to the rotation direction.

The gears 45a and 45b have the same number of teeth. The gears 45a and 45b are arranged so that their teeth are alternately located in a circumferential direction. The spring 49 is provided between the gears 45a and 45b. Hence, torsional torque is exerted by the spring 49 on the gears 45a and 45b. Thus, the torque variations caused by the engine 4 can be absorbed.

The gear 45a of the scissor gear 45 is engaged with a gear 32a (FIG. 2) of the crankshaft 32. The gear 45a (of the scissor gear 45) is fixed to the bottom 46a of the clutch housing 46 so as to be unrotatable relative thereto. With this configuration, the gear 45a of the scissor gear 45 and the clutch housing 46 integrally rotate following the rotation of the crankshaft 32.

A needle bearing 53 and a spacer 54, which is nonrotatably fixed to the main shaft 33, are disposed between the scissor gear 45 and the main shaft 33. The needle bearing 53 enables the scissor gear 45 to be rotatable with respect to main shaft 33. In other words, rotation of the scissor gear 45 is not transmitted directly to the main shaft 33.

Clutch Boss 48

A clutch boss 48 is nonrotatably fixed to the main shaft 33 by a nut 67. More specifically, the clutch boss 48 rotates together with the main shaft 33. Further, a thrust bearing 63 is disposed between the clutch boss 48 and the scissor gear 45. Thereby, the scissor gear 45, the needle bearing 53, and the spacer 54 are regulated so that they do not come closer than a predetermined distance to the clutch boss 48. In other words, movement of the scissor gear 45, the needle bearing 53, and the spacer 54 toward the clutch boss 48 in the axial direction of the main shaft 33 is restricted.

Plate Group 66

A plurality of friction plates 64 are arranged inside the clutch housing 46. Each friction plate 64 is fixed to the clutch housing 46 with respect to the rotational direction of the main shaft 33. Thus, the plurality of friction plates 64 rotate together with the clutch housing 46. Each friction plate 64 is displaceable in the axial direction of the main shaft 33. Thus, the distance between two adjacent friction plates 64 is variable.

The plurality of friction plates 64 are arranged in the axial direction of the main shaft 33. Each clutch plate 65 is disposed between a respective pair of friction plates 64. The clutch plate 65 is opposed to the adjacent friction plates 64. Each clutch plate 65 is fixed to the clutch boss 48 with respect to the rotational direction of the main shaft 33. Hence, the plurality of clutch plates 65 rotates together with the clutch boss 48. Further, each clutch plate 65 is displaceable with respect to the axial direction of the main shaft 33. Hence, the distance between mutually adjacent clutch plates 65 is variable.

In the present embodiment, a plate group 66 comprises the plurality of friction plates 64 and the plurality of clutch plates 65, as shown in FIG. 3.

Pressure Plate 77

A pressure plate 77 is disposed on the right side of the main shaft 33, as depicted in reference to FIG. 3. The pressure plate 77 is formed into a substantially circular disc shape. A subclutch 100, to be described later, is provided at a central portion of the pressure plate 77. A radially outward end of the pressure plate 77 is engaged with the arms 46d. Therefore, the pressure plate 77 is not rotatable with respect to the clutch housing 46, but it rotates together with the clutch housing 46.

A pressing portion 77b that projects toward the plate group 66 is formed on the pressure plate 77 at an outer section thereof, as illustrated in FIG. 3. The pressing portion 77b faces the rightmost friction plate 64 in the plate group 66. When the pressure plate 77 moves leftward, the pressing portion 77b pushes the plate group 66 leftward. Consequently, the friction plates 64 and the clutch plates 65 of the plate group 66 are even more strongly press-contacted with each other.

A plurality of cam surfaces 81, each of which supports a roller weight 41, are formed on a surface opposite to the plate group 66 in the radially outward portion of the pressure plate 77. Thus, the plurality of cam surfaces 81 and the plurality of roller weights 41 are provided along the circumferential direction. The plurality of cam surfaces 81 are arranged radially about the longitudinal axis of the main shaft 33. Each cam surface 81 is inclined rightward as it moves outward in the radial direction.

A roller retainer 78 is disposed on the right side of the pressure plate 77. The roller retainer 78 is formed into a ring band shape when viewed from the axial direction of the main shaft 33. The roller retainer 78 is opposed to the cam surfaces 81 of the pressure plate 77. Therefore, a space 82 that becomes narrower in the radial direction of the main shaft 33 is formed by each cam surface 81 and the roller retainer 78.

Similar to the pressure plate 77, a radially outward end of the roller retainer 78 is engaged with the plurality of arms 46d. The roller retainer 78 is thereby nonrotatable about the clutch housing 46. In other words, the roller retainer 78 rotates together with the clutch housing 46. On the other hand, the roller retainer 78 is displaceable with respect to the clutch housing 46 in the axial direction of the main shaft 33. Further, spring holders 122a of elastic members 122 described below are fixed to the roller retainer 78.

The roller retainer 78 is urged leftward by a disc spring 83, which serves as a biasing member. In other words, the roller retainer 78 is urged toward the plate group 66 by disc spring 83. The roller retainer 78 and the disc spring 83 constitute an abutment member 70 that presses the roller weights 41 toward the cam surfaces 81.

A roller weight 41 is provided in each of a plurality of spaces 82. The respective roller weights 41 revolve around the main shaft 33 following the rotation of the clutch housing 46 and move on their respective cam surfaces 81 radially outward by means of a centrifugal force generated during the revolution. The roller weight 41 receives a reaction force from the abutment member 70 and presses the pressure plate 77 toward the plate group 66 side.

While described further below, in the present embodiment, the pressure plate 77 is configured to be in pressure-contact with the plate group 66 even in an idling state. Thereby, in the present embodiment, even in the idling state, the clutch 2 is set to a partial clutch engagement state and a drive force sufficient for reduced speed driving is transmitted to the rear wheel 19. Further, in the present embodiment, the pressure plate 77 presses the plate group 66 into contact even in the state where the engine 4 is stopped and the roller weights 41 are disposed radially inward on the cam surfaces 81. In this state, however, the roller weights not to press the pressure plate 77 towards the plate group 66 side with the same force as when they are disposed outward on the cam surfaces 81. Thereby, in the present embodiment, the clutch 2 is set to the engaged state even when the engine 4 is in a stopped state. Hence, in the state in which the engine 4 is stopped, the motorcycle 1 can be parked as if a brake is being applied, without operating a brake mechanism.

When the rotational speed of the crankshaft 32 is lower than a predetermined value, such as an idling state, the rotational speed of the clutch housing 46 also becomes lower. Therefore, centrifugal force exerted on the roller weights 41 is relatively small, and so the roller weights 41 are located relatively inward. Therefore, the force with which the roller weights 41 press the pressure plate 77 to the left us reduced. As a consequence, the degree of pressure-contact of the plate group 66 is reduced, and the torque transmittable from the clutch housing 46 to the clutch boss 48 thereby becomes relatively small.

On the other hand, when the rotational speed of the crankshaft 32 becomes relatively high, the rotational speed of the clutch housing 46 also becomes relatively high. Hence, as the rotational speed of the clutch housing 46 increases, the centrifugal force exerted on the roller weights 41 also increases. If the centrifugal force exerted on the roller weights 41 is equal to or more than a predetermined value, the roller weights 41 move outward. The pressure plate 77 is thereby pressed toward the left side by the roller weights 41 and moves toward the plate group 66. As a result, the plate group 66 is placed in a relatively strong pressed-contact state and the amount of torque that is transmittable from the clutch housing 46 to the clutch boss 48 is thereby relatively increased.

Parking Brake Mechanism

In the present embodiment, although the clutch 2 is a centrifugal clutch, even when the engine 4 is in a stopped state, the clutch 2 can be set to the clutch-engaged state. More specifically, the clutch 2 includes a mechanism that sets a state where an engine brake is applied to the motorcycle 1. Hence, even when the engine 4 is in a stopped state, the clutch 2 is capable of transmitting torque. The mechanism mentioned above will be referred to as a parking brake mechanism 120. The parking brake mechanism 120 described more fully below includes an elastic member retainer 121 and the elastic member 122.

Figure 7A:
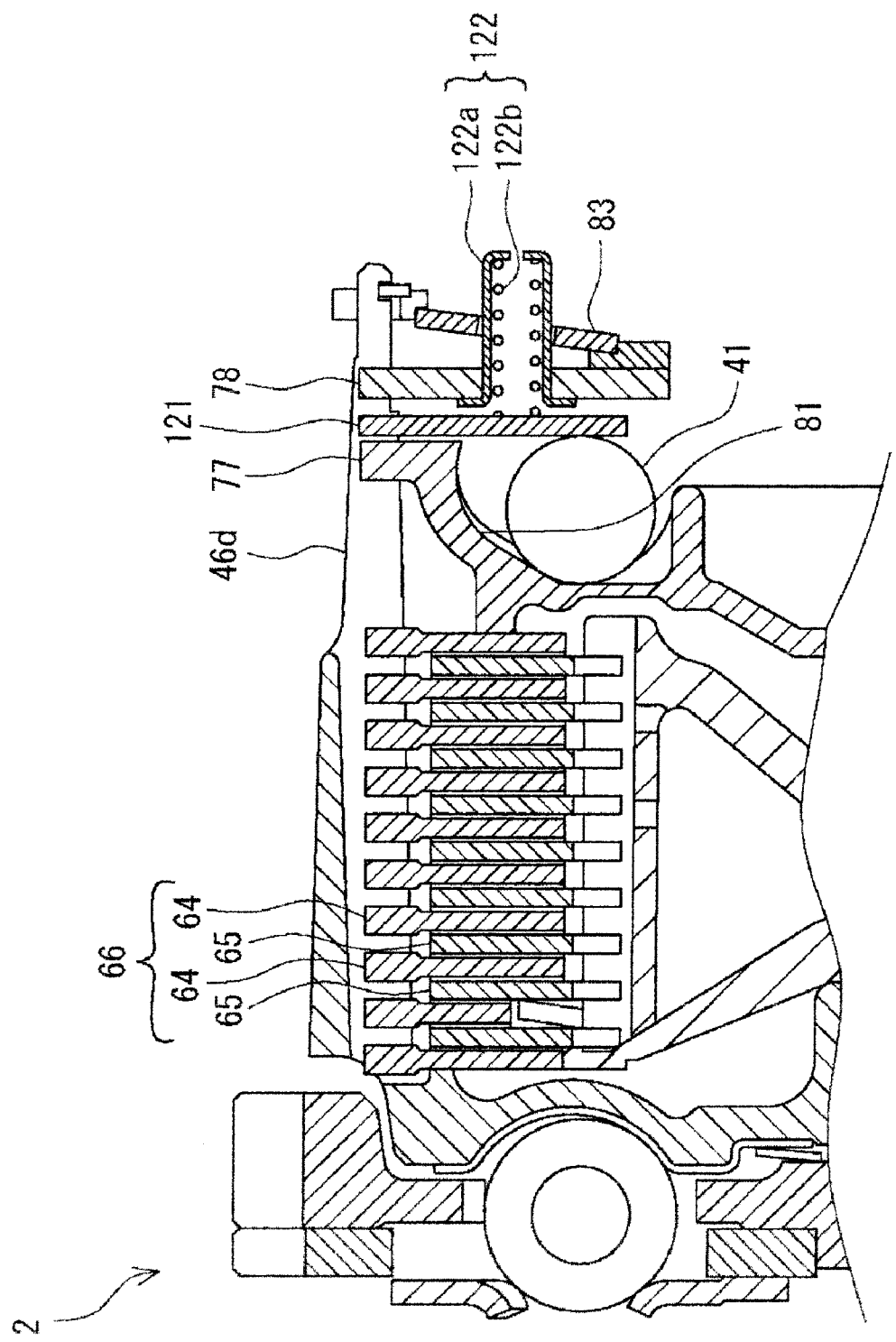
FIG. 7a is an enlarged partial cross-sectional view of the clutch of FIG. 3 when the motorcycle engine in a stopped state.

As shown in FIG. 7a, the elastic member retainer 121 is disposed between the pressure plate 77 and the roller retainer 78. The elastic member retainer 121 is an annular plate having a ring-band shape when viewed from the axial direction of the main shaft 33. In addition, an outer end portion of the elastic member retainer 121 is engaged with the arms 46d. Hence, the elastic member retainer 121 is not rotatable relative to the clutch housing 46, but rotates with the clutch housing 46.

Elastic member 122 comprises, in the present embodiment, a plurality of spring holders 122a and springs 122b. The spring holders 122a are fixed to the roller retainer 78, which is disposed on the right side of the elastic member retainer 121. Each spring holder 122a has a tubular shape. As best shown in FIG. 7a, the spring holders 122a extend through the roller retainer 78 and the disc spring 83. The spring holders 78 are also fixed to the roller retainer 78. Through-holes (not shown) of each of the roller retainer 78 and the disc spring 83 have a shape analogous to, for example, the cross-section of the tubular spring holder 122a. The sizes of the respective through-holes are not specifically limited. The sizes of the respective through-holes can be arbitrary as long as they do not interfere with the function of the roller retainer 78 to support the disc spring 83, and the disc spring 83 to urge the roller retainer 78 toward the plate group 66, and the like is maintained.

Further, a spring 122b is disposed in contact with the elastic member retainer 121. The spring 122b is a coil spring. While one end of the spring 122b is disposed in contact with the elastic member retainer 121, the other end on the opposite side is situated in contact with a tubular head portion of the spring holder 122a. According to the present embodiment, the spring 122b is contained within the interior of the tubular body of the spring holder 122a fixed to the roller retainer 78 in a compressed state, i.e. with its compressed length being shorter than its natural length. More specifically, the spring 122b presses the elastic member retainer 121 leftward with the use of its biasing force in the spring expansion direction. The number of coil turns of the spring 122b is not specifically limited. Further, while, in the present embodiment, the spring 122b is formed as a coil spring, the type of the spring is not specifically limited. A combined unit of the spring holder 122a and the spring 122b is herein referred to as the elastic member 122 for the sake of convenience.

FIG. 7a is an enlarged cross-sectional view of the clutch 2 in the state in which the engine 4 is stopped. The respective roller weights 41 disposed on the cam surfaces 81 of the pressure plate 77 are constantly in contact with the elastic member retainer 121 irrespective of whether the engine 4 is in an operational or stopped state. Further, the roller retainer 78 is urged leftward by the biasing force of disc spring 83, and the parking brake mechanism 120 presses the elastic member retainer 121 against the respective roller weights 41 by means of the biasing force of the spring 122b. The roller weights 41 in turn press the pressure plate 77 toward the plate group 66 through the respective cam surfaces 81. Upon the receipt of the centrifugal force generated by the rotation of the main shaft 33, the respective roller weights 41 move radially outward on the pressure plate 77. The roller weight movement causes a change in the state of contact between the respective roller weights 41 and the elastic member retainer 121.

Figure 7B:
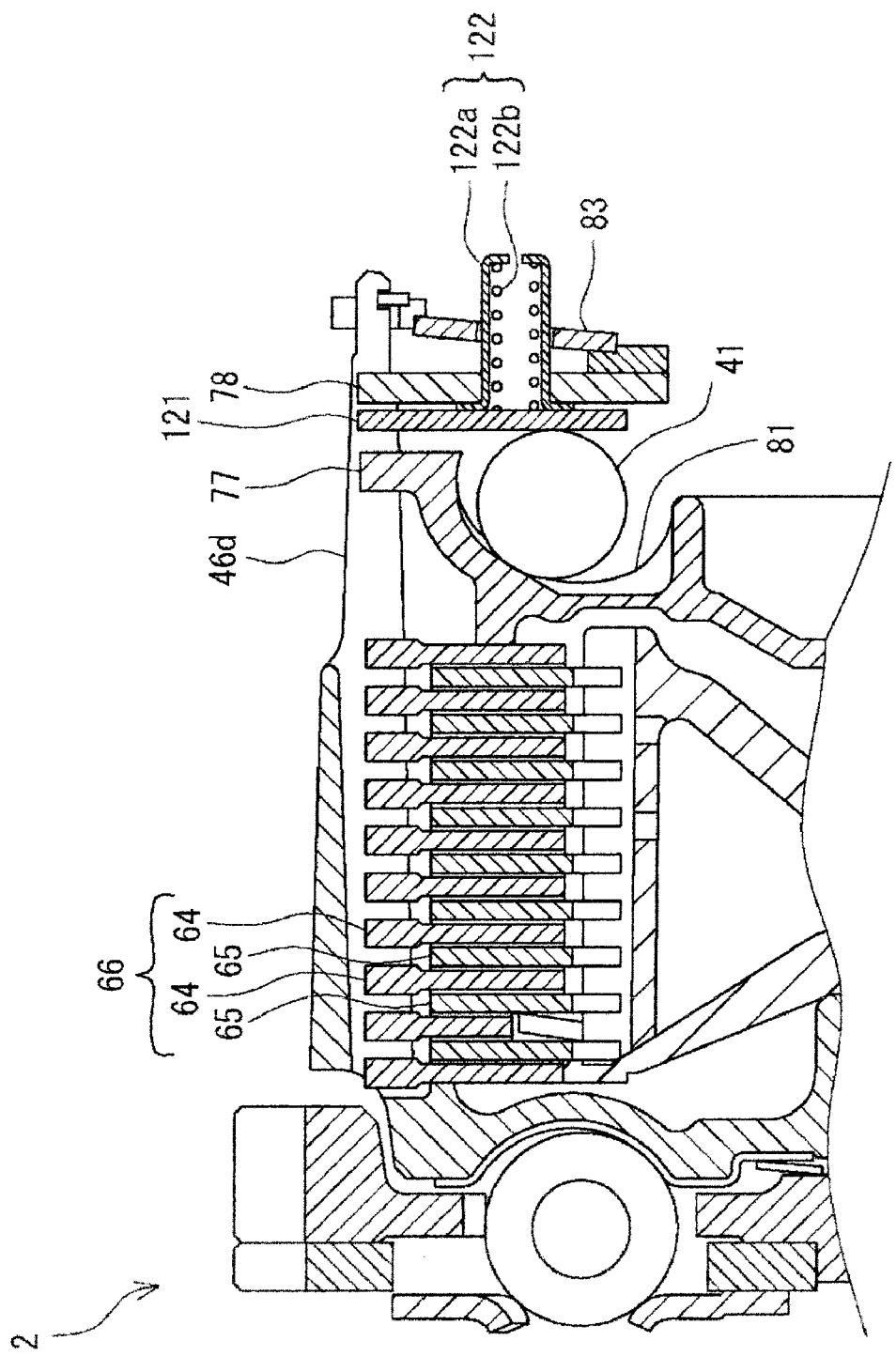
FIG. 7b is an enlarged partial cross-sectional view of the clutch of FIG. 3 in an idling state.

FIG. 7b shows a state where the engine 4 is started. In this event, the engine 4 is in an idling state. As depicted in FIG. 7b, the roller weights 41 have moved radially outward (from the state shown in FIG. 7a in which the engine 4 is stopped) on the cam surfaces 81, respectively, as a result of the centrifugal force generated during rotation of the main shaft 33. Each of the cam surfaces 81 is tapered rightward with increasing radial distance from the axis of main shaft 33, which results in the elastic member retainer 121 being moved in a rightward direction as the roller weights 41 move radially outward. The rightward moving elastic member retainer 121 presses the spring 122b in a rightward direction. Further, while rightward moving, the elastic member retainer 121 makes contact with the roller retainer 78 with the spring holder 122a being sandwiched therebetween. The roller retainer 78 and the elastic member retainer 121, thus brought into contact with each other, receive the biasing force of the disc spring 83 in the leftward direction. Then, with the biasing force of the disc spring 83, the roller retainer 78 and the parking brake mechanism 120 press the pressure plate 77 leftward via the roller weights 41.

Figure 7C:
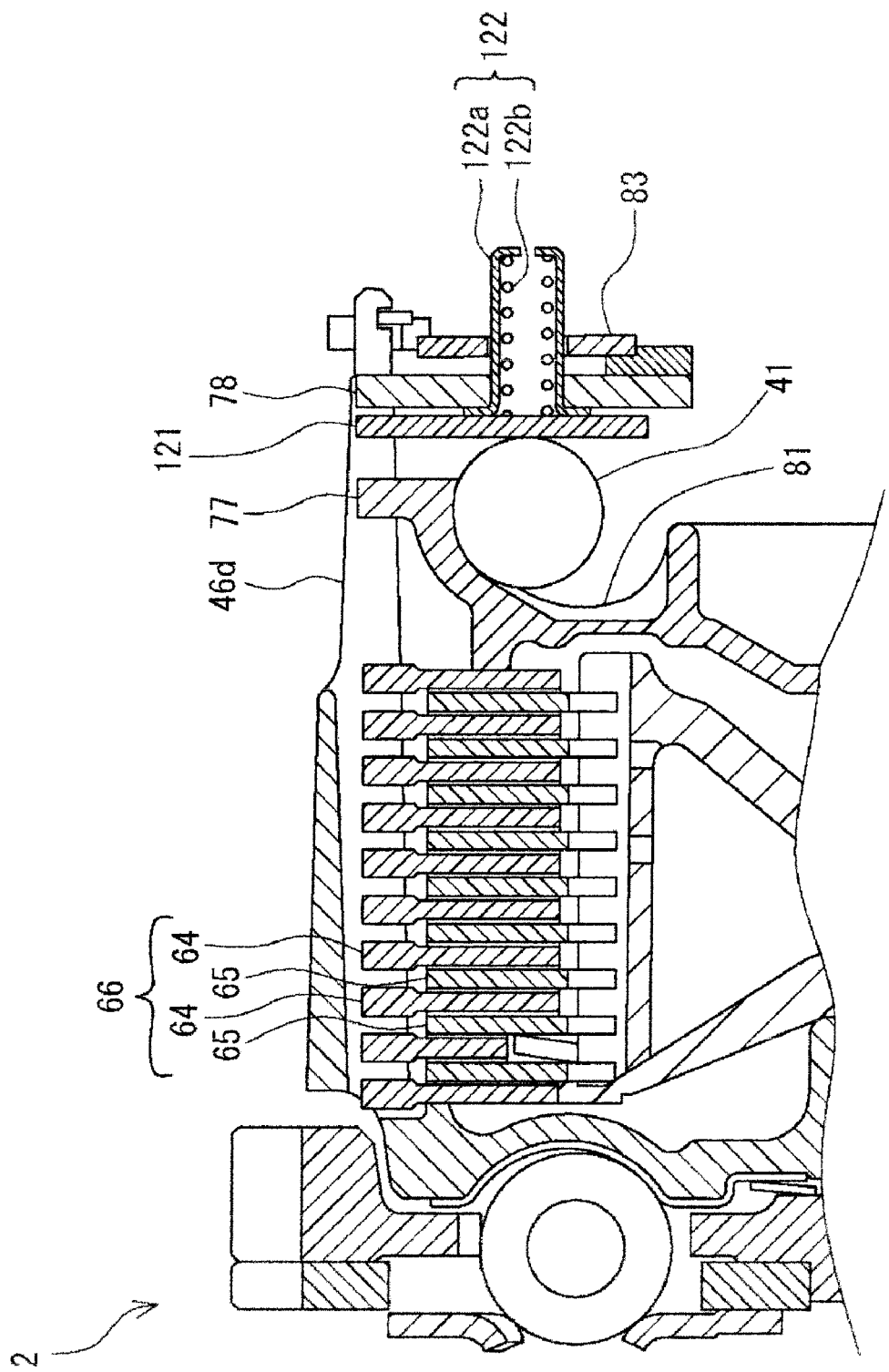
FIG. 7c is an enlarged partial cross-sectional view of the clutch of FIG. 3 when the motorcycle engine is in a driven state.

FIG. 7c shows a state where rotation of the crankshaft 32 of the engine 4 has increased relative to the engine idling state. In this event, movement of the respective roller weights 41 in the centrifugal direction is constrained by the shape of the respective cam surfaces 81 on the radially outer side of the pressure plate 77. Hence, even in the case where the rotation of the crankshaft 32 is further increased, the positions of the respective roller weights 41 having received the centrifugal force would remain unchanged from the position shown in FIG. 7c.

Sub-Clutch 100

As shown in FIG. 3, the clutch 2 according to the present embodiment includes a sub-clutch 100. The sub-clutch 100 includes a friction plate 101, a first pressing plate 102 that faces a left surface (hereinafter, "first friction surface") 101a of the friction plate 101, and a second pressing plate 103 that faces a right surface (hereinafter, "second friction surface") 101b of the friction plate 101.

The friction plate 101 is engaged with the pressure plate 77 so as to rotate together with the pressure plate 77. Specifically, one or more slide arm sections 77c are formed on the pressure plate 77. One or more corresponding grooves (not shown) are formed on a radially outward side of the friction plate 101. Each groove (of the friction plate 101) is slidably engaged with a slide arm section 77c, whereby the friction plate 101 rotates together with the pressure plate 77.

The first pressing plate 102 is fixed to a short pushrod 43a, which will be described below. Therefore, the first pressing plate 102 freely moves together with the short pushrod 43a in the axial direction of main shaft 33. Further, the first pressing plate 102 rotates together with the short pushrod 43a.

The second pressing plate 103 is fitted onto the short pushrod 43a by way of matching serrated surfaces. Thus, the second pressing plate 103 rotates together with the short pushrod 43a but is movable relative to the short pushrod 43a in the axial direction of main shaft 33. The second pressing plate 103 includes a boss 103a extending rightward. This boss 103a rotatably supports the pressure plate 77 via a bearing 104. The second pressing plate 103 and the pressure plate 77 are thereby relatively rotatable to each other. Furthermore, the second pressing plate 103 and the pressure plate 77 are configured to move integrally in the axial direction of main shaft 33.

When the short pushrod 43a moves rightward, the first pressing plate 102 also moves rightward. The first pressing plate 102 presses the friction plate 101 against the second pressing plate 103 accordingly. As a result, the friction plate 101 is interposed between the first and the second pressing plates 102 and 103. A torque of the pressure plate 77 is thereby transmitted to the first and the second pressing plates 102 and 103 via the friction plate 101.

As described further below, a through-hole 33a is formed within the main shaft 33. The short pushrod 43a, a ball 43c, and a long pushrod 43b of a push mechanism 43 are inserted into the through-hole 33a. A gap 89 between, for example, an inner wall of the through-hole 33a and the long pushrod 43b serves as an oil supply path for supplying oil to the clutch 2.

Further, an oil supply path 110 that guides the oil in the gap 89 to the sub-clutch 100 is formed in the short pushrod 43a. The oil supply path 110 is configured to include an oil introduction path 110a formed in a left portion of the short pushrod 43a, an oil path 110b formed in a central portion of the short pushrod 43a, and an oil discharge path 110c formed in a right portion of the short pushrod 43a. The oil introduction path 110a comprises a hollow conduit extending in the radial direction and is connected to the oil path 110b extending in the axial direction of main shaft 33. Likewise, the oil discharge path 110c comprises a hollow conduit extending radially and connected to the oil path 110b. An outlet of the oil discharge path 110c, that is, the radially outward opening of the oil discharge path 110c, is open towards the first friction surface 101a and the second friction surface 101b of the friction plate 101. Thus, the oil in the oil supply path 110 is supplied toward the first friction surface 101a and the second friction surface 101b.

Power-Assist Mechanism

As shown in FIG. 3, the clutch 2 according to the present embodiment includes a power-assist mechanism 200. The power-assist mechanism 200 converts part of the torque of the pressure plate 77 into a force for disengaging the clutch 2 so as to reduce the force required to disengage the clutch 2. The power-assist mechanism 200 according to the present embodiment comprises a so-called ball cam. Particularly, the power-assist mechanism 200 includes a slide shaft 201 fixed to the second pressing plate 103, a first cam plate 202, a second cam plate 203, a ball plate 204, and a coil spring 205 that biases the second cam plate 203 in a direction which separates the second cam plate 203 from the first cam plate 202. A support plate 250 that supports the coil spring 205 by abutting a right portion of the coil spring 205 is fixed onto a terminal side of the slide shaft 201.

Figure 5A:
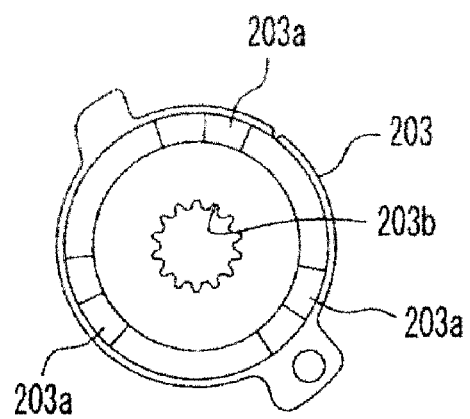
FIG. 5a is a rear view of a second cam plate.
Figure 5B:
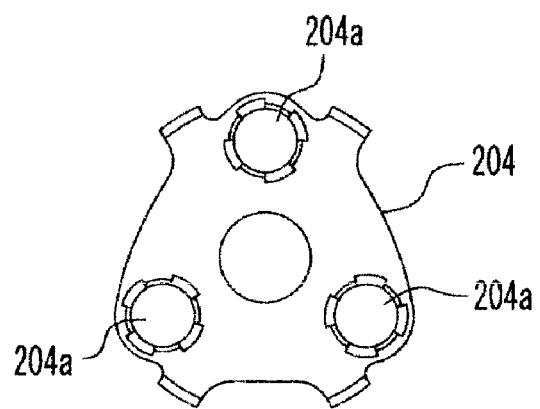
FIG. 5b is a front view of a ball plate.

As shown in FIG. 5(b), three balls 204a are rollably supported on the ball plate 204. The three balls 204a are arranged equidistantly in a circumferential direction about a longitudinal axis of the slide shaft 201. However, the number of balls 204a supported on ball plate 204 does not have to be limited to three. Other ball cam configurations may be utilized as needed.

Figure 5C:
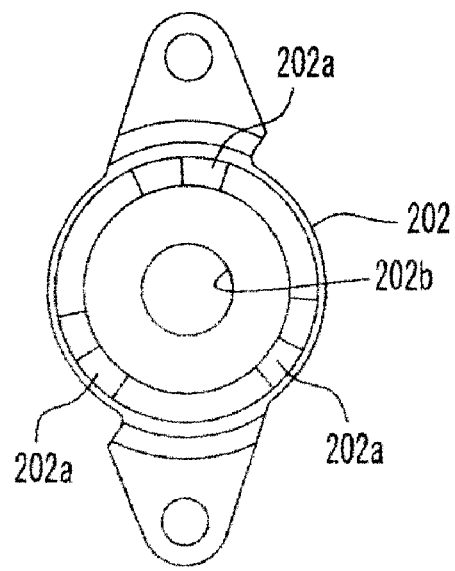
FIG. 5c is a front view of a first cam plate.

As shown in FIG. 5(c), a through-hole 202b is formed at a central portion of the first cam plate 202. As shown in FIG. 3, the slide shaft 201 is inserted through the through-hole 202b. The slide shaft 201 is movable axially with respect to the first cam plate 202 and rotatable with respect to the first cam plate 202. That is, the first cam plate 202 is configured not to rotate even if the slide shaft 201 rotates.

As shown in FIG. 5(a), a serrated hole 203b is formed at a central portion of the second cam plate 203. The second cam plate 203 is fitted onto a corresponding serrated portion of the slide shaft 201. Thus, while the second cam plate 203 is axially movable with respect to the slide shaft 201, the second cam plate 203 rotates together with the slide shaft 201.

One end 205b of the coil spring 205 is secured to a pin 210 fixed to the crankcase 31. The other end 205a of the coil spring 205 is secured to the second cam plate 203. By doing so, the second cam plate 203 receives a torque from the coil spring 205 so as to rotate around the slide shaft 201 in a predetermined direction discussed below. Further, the second cam plate 203 receives a slide force for moving toward the first cam plate 202 in the axial direction of the slide shaft 201 by means of a biasing force that is a sum of a biasing force of the disc spring 83 and that of the coil spring 205.

A first cam surface 202a is formed on a right surface (or the front-side surface in FIG. 5c) of the first cam plate 202. A second cam surface 203a is formed on a left surface (or the front-side surface in FIG. 5a) of the second cam plate 203. The first cam surface 202a and the second cam surface 203a are formed so that the balls 204a ride on opposing cam lobes of cam surfaces 202a and 203a when the second cam plate 203 rotates in a predetermined direction and so that the balls 204a are circumferentially held between the opposing cam lobes of cam surfaces 202a and 203a when the second cam plate 203 rotates in a direction opposite to the predetermined direction back to the original rest position of the cam plate 203. In other words, both cam surfaces 202a and 203a are formed so that the two cam plates 202 and 203 are forced by the balls 204a to separate from each other and the second cam plate 203 moves rightward when the second cam plate 203 rotates in the predetermined direction against the biasing force that is the sum of the biasing force of the disc spring 83 and that of the coil spring 205. Furthermore, both cam surfaces 202a and 203a are formed so that balls 205b move leftward on cam surface 202a and cam surface 203a (together with cam plate 203) moves leftward by a biasing force that is the sum of the biasing force of the disc spring 83 and that of the coil spring 205 when the second cam plate 203 rotates in the opposite direction.

The coil spring 205 biases the second cam plate 203 and the slide shaft 201 of the power-assist mechanism 200 rightward. On the other hand, the disc spring 83 biases the second cam plate 203 and the slide shaft 201 leftward via the pressure plate 77. The biasing force by which the disc spring 83 biases the second cam plate 203 and slide shaft 201 leftward is greater than the biasing force by which the coil spring 205 biases the second cam plate 203 and slide shaft 201 rightward. Hence, disc spring 83 and the coil spring 205 urge, as a whole, the slide shaft 201 and second cam plate 203 leftward in FIG. 3, and, as a result, the pressure plate 77 is also urged leftward. In other words, the disc spring 83 and the coil spring 205 urge the pressure plate 77 toward the plate group 66 as a whole. The pressure plate 77 is thereby urged into a pressed-contact state with the plate group 66 even if the engine 4 is in an idling state.

More particularly, the disc spring 83 biases the slide shaft 201 leftward via the pressure plate 77, bearing 104, and the second pressure plate 103. Similarly, the disc spring 83 biases the second cam plate 203 leftward via the pressure plate 77, bearing 104, second pressure plate 103, slide shaft 201, and support plate 250. By contrast, the coil spring 205 biases the slide shaft 201 and the second cam plate 203 rightward as a result of the torsion force the spring 205 generates on the second cam plate 203, which in turn is converted by the power-assist mechanism 200 into an axial force. This axial force is applied to the second cam plate 203, which in turn urges the slide shaft 201 rightward via support plate 250.

The term "idling state" generally means a state in which the engine 4 is running and the accelerator grip (not shown) of the motorcycle 1 is not turned by the rider. In the present embodiment, the pressure plate 77 is constantly urged toward the plate group 66 by the entirety of the parking brake mechanism 120, the disc spring 83 and the coil spring 205. Thereby, even in the idling state, the friction plates 64 and the clutch plates 65 contact each other and thereby transmit a portion of the rotational drive force while sliding. Thus, the clutch 2 is in a so-called partial clutch engagement state even when the engine is in an idling state.

Figure 6A:
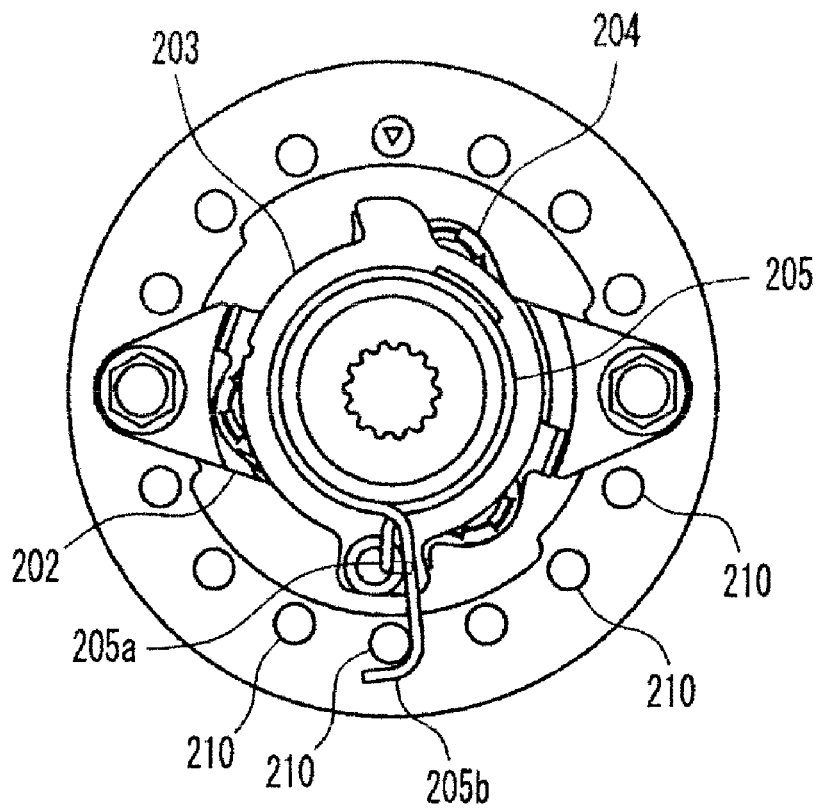
FIGS. 6a and 6b are front views of a power-assist mechanism in alternative modes of operation.
Figure 6B:
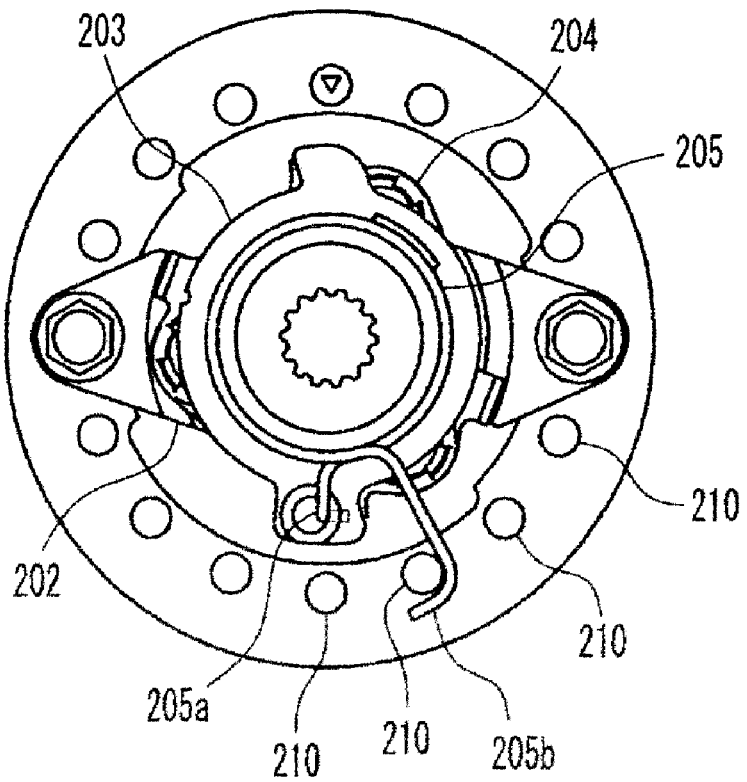

As shown in FIGS. 6a and 6b, the clutch 2 includes a plurality of pins 210 disposed circumferentially about a rotational center of the pressure plate 77 (which corresponds to a center of the coil spring 205). These pins 210 are formed to enable one end 205b of the coil spring 205 to be anchored. Thus, by appropriately selecting a pin 210 for anchoring one end 205b of the coil spring 205, the torsional force of the coil spring 205 can be adjusted, which in turn will adjust the axial biasing force generated by spring 205 via power-assist mechanism 200. For example, by changing the pin 210 for anchoring one end 205b of the coil spring 205 from the pin 210 shown in FIG. 6a to that shown in FIG. 6b, the axial biasing force of the coil spring 205 against the pressure plate 77 can be increased.

Clutch Release Mechanism 86

A clutch release mechanism 86 is provided in the clutch 2 of the present embodiment. Upon operation of the clutch lever 24 by a rider, the clutch release mechanism 86 forcibly releases the press-contact state of the plate set 66. The clutch release mechanism 86 makes it possible to effect the disengagement of the clutch 2 through a manual operation by a rider of the motorcycle 1.

As described above, in the motorcycle 1 according to the present embodiment, the clutch 2 is configured so as to be in the partial clutch engagement state even when the engine is in an idling state. Further, in the motorcycle 1 according to the present embodiment, the clutch 2 is configured so as to be in the engaged state even when the engine 4 is in a stopped state. However, the clutch 2 in any one of the partial clutch engagement state and the engaged state can be disengaged by the clutch release mechanism 86.

The clutch release mechanism 86 includes the push mechanism 43 (see FIG. 3) and a drive mechanism 87 (see FIG. 4) that drives the push mechanism 43. As shown in FIG. 3, the push mechanism 43 includes the short pushrod 43a, the long pushrod 43b, and the ball 43c interposed between the short pushrod 43a and the long pushrod 43b. The through-hole 33a is formed in the interior of the main shaft 33, and the push mechanism 43 is arranged within the through-hole 33a. The through-hole 33a also serves as an oil supply path for supplying oil to the respective sliding portions or the like of the clutch 2. More specifically, the oil is supplied to the respective sliding portions of the clutch 2 via the gap 89 formed between the inner wall of the through-hole 33a and the push mechanism 43.

A right end of the short pushrod 43a protrudes from the main shaft 33 and is attached to the first pressing plate 102 of the sub-clutch 100. Thus, when the sub-clutch 100 is engaged, the short pushrod 43a rotates integrally with the pressure plate 77. Further, when the sub-clutch 100 and the clutch 2 are engaged, the short pushrod 43a rotates in response to rotation of the clutch housing 46. On the other hand, the long pushrod 43b does not rotate together with the main shaft 33. Hence, the ball 43c is provided between the short pushrod 43a and the long pushrod 43b to reduce the sliding resistance between the short pushrod 43a and the long pushrod 43b.

FIG. 4 is a cross-sectional view showing the pushrod drive mechanism 87. As shown in FIG. 4, the left end of the long pushrod 43b is located leftward of a left end of the main shaft 33, which is supported by bearing 94 disposed between main shaft 33 and crankcase 31, and extends to the drive mechanism 87. In FIG. 4, the section below the longitudinal axis of the main shaft 33 represents the state in which the clutch release mechanism 86 is not being driven. In other words, the section below the longitudinal axis of the main shaft 33 in FIG. 4 represents the state in which the push mechanism 43 is shifted relatively to the left and the pressure plate 77 is not displaced rightward by the push mechanism 43. On the other hand, the section above the longitudinal axis of the main shaft 33 in FIG. 4 represents the state in which the clutch release mechanism 86 is being driven. In other words, the section above the longitudinal axis of the main shaft 33 of FIG. 4 represents the state in which the push mechanism 43 is shifted relatively to the right and the pressure plate 77 is displaced rightward by the push mechanism 43.

As shown in FIG. 4, the drive mechanism 87 includes a cylinder 90 and a piston 91. The piston 91 is slidable within the cylinder 90 in the axial direction of the main shaft 33. The piston 91 is attached to the long pushrod 43b. Hence, when the piston 91 slides, the long pushrod 43b also moves in the axial direction of the main shaft 33.

An operating chamber 92 is formed between the piston 91 and the inner wall of cylinder 90. The operating chamber 92 is filled with oil.

A helical compression spring 93 is disposed between the piston 91 and the crankcase 31. The piston 91 is urged leftward in FIG. 4 away from the crankcase 31 by the helical compression spring 93. In other words, the piston 91 is urged in the direction in which the push mechanism 43 is displaced leftward to engage the clutch 2. Hence, when a rider of the motorcycle 1 releases the operation of the clutch lever 24 (see FIG. 1), the push mechanism 43 automatically moves leftward.

Operation of Clutch

Operation of the clutch 2 will be described herebelow. First, an operation for causing the clutch 2 to be disengaged will be described.

When a rider of the motorcycle 1 grasps the clutch lever 24 (see FIG. 1), the internal pressure of the operating chamber 92 of the drive mechanism 87 rises. The piston 91 thereby moves rightward (in FIG. 4) and the long pushrod 43b also moves rightward. The ball 43c and the short pushrod 43a also move to the right and the first pressing plate 102 of the sub-clutch 100 moves rightward. The friction plate 101 of the sub-clutch 100 is thereby sandwiched between the first and the second pressing plates 102 and 103 so that the sub-clutch 100 enters an engaged state. As a consequence, the slide shaft 201 of the power assist mechanism 200 rotates with the pressure plate 77 in the predetermined direction.

Upon rotation of the slide shaft 201 in the predetermined direction, the second cam plate 203 of the power-assist mechanism 200 also rotates in the same direction. The balls 204a on the ball plate 204 thereby ride upon opposing cam lobes of the first and second cam surface 202a and the second cam surface 203a, and the second cam plate 203 is pressed rightward by the balls 204a. Therefore, the slide shaft 201 is also pushed to the right. As a consequence, the pressure plate 77 moves to the right by a force by which the short pushrod 43a presses the pressure plate 77 rightward via the first pressing plate 102 and the friction plate 101 and a force by which the slide shaft 201 pulls the pressure plate 77 rightward via the second pressing plate 103 and the bearing 104. In this event, the pressure plate moves rightward in response to the pressing force and the pulling force. Accordingly, the pressed-contact state of the disc group 66 is thereby released to disengage the clutch 2.

It should be noted that rotation of the second cam plate 203 is restricted so as not to exceed a predetermined amount. For this reason, in the state in which the clutch 2 is disengaged, the friction plate 101 rotates with respect to the first pressing plate 102 and the second pressing plate 103. More specifically, the friction plate 101 slides with respect to the first and the second pressing plates 102 and 103. However, since the oil is supplied to the first and the second friction surfaces 101a and 101b of the friction plate 101, wear of the friction plate 101 is suppressed.

Next, an operation at the time of engagement of the clutch 2 will be described.

At the time of engagement of clutch 2, the clutch lever 24 held by the rider is released. This causes reduction in the internal pressure of the operating chamber 92 of the drive mechanism 87. Accordingly, the piston 91 and the long pushrod 43b move leftward in FIG. 4. The ball 43c and the short pushrod 43a also move to the left and the first pressing plate 102 of the sub-clutch 100 moves to the left. Due to this, the first pressing plate 102 of the sub-clutch 100 separates from the friction plate 101. Further, the second pressing plate 103 is not pressed rightward by the first pressing plate 102. Consequently, a rightward pressing force against the slide shaft 201 is eliminated and the second cam plate 203, which receives the biasing force of the coil spring 205, rotates in the reverse direction. Thereby, the second cam plate 203 and the slide shaft 201 move to the left. Consequently, the second pressing plate 103 also moves to the left.

Further, because the rightward pressing force applied by the first pressing plate 102 has been removed, the pressure plate 77 moves leftward by the biasing force of the disc spring 83. As a consequence, the plate group 66 is pressed into frictional contact with each other by the pressure plate 77 so that the clutch 2 is engaged. At this time, the friction plate 101 of the sub-clutch 100 separates from the second pressing plate 103.

In the clutch 2 according to the present embodiment, the biasing force applied to the pressure plate 77 by the disc spring 83 varies according to the radial position of the roller weights 41. More specifically, when the rotational speed of the pressure plate 77 is high, the roller weights 41 move outward in a radial direction. As a consequence, the roller weights 41 move rightward to deform the disc spring 83 greatly. Hence, because the disc spring 83 is greatly deformed by roller weights 41, the urging force received by the pressure plate 77 from the disc spring 83 is relatively increased, even without an increased coefficient of elasticity of the disc spring 83. On the other hand, when the rotational speed of the pressure plate 77 is low, the roller weights 41 move inward in the radial direction. As a consequence, the roller weights 41 move leftward and the amount of deformation of the disc spring 83 decreases. Hence, the biasing force the pressure plate 77 receives from the disc spring 83 becomes relatively small.

When the rotational speed of the engine is high, the pressure plate 77 presses the plate group 66 into contact with each other with a large pressing force. In the clutch 2 according to the present embodiment, when the rotational speed of the engine increases, the roller weights 41 move outward in a radial direction and the amount of deformation of the disc spring 83 increases accordingly. Hence, a sufficiently large pressing force can be obtained even without increasing the coefficient of elasticity of the disc spring 83 to a high value. Therefore, the elastic coefficient of the disc spring 83, that is, the spring capacity, can be relatively small.

Transmission Torque of Clutch

One example of a variation in torque being transmitted from the clutch 2 to the rear wheel 19 (via transmission 5) during the operation of the motorcycle 1 will be described hereinbelow with reference to FIGS. 7 and 8. As shown in FIG. 7a, when the engine 4 is in the stopped state, the pressure plate 77 presses the plate group 66 under the biasing force of the elastic member 122. In this event, as shown in FIG. 8, a transmission torque TP is generated in the clutch 2.

At the time of starting the engine 4 or at the time when the motorcycle 1 is started after the start of the engine 4, the operation of disengaging the clutch 2 is performed by use of the clutch lever 24. As shown in FIG. 8, a transmission torque to the rear wheel 19 in the disengaged state of the clutch 2 is denoted by T0. The transmission torque T0 of the clutch 2 in this event does not become zero. Torque is transmitted because the plate group 66 remains in partial contact although the oil supplied to the clutch 2 forms an oil film on the plate group 66 and related parts.

Further, as described above, the clutch 2 of the present embodiment is configured to be in a partial clutch engagement state even when the engine 4 is in the stopped state. In such a partial clutch engagement state, the transmission torque is set to a magnitude at which reduced speed driving can be performed through appropriate operation of the clutch lever 24 without frequent iteration of the open and close operation of the acceleration grip. In the case of the motorcycle 1, a clutch transmission torque such as in the partial clutch engagement state is referred to as a necessary transmission torque for the sake of convenience. As shown in FIG. 8, a transmission torque of the clutch 2 at an arbitrary idling rotational speed ri of the engine 4 is denoted by Ti. In this case, the magnitude of the transmission torque Ti takes a value that is constantly greater than that of the necessary transmission torque. Further, regarding the idling rotational speed, the rotational speed is adjustable in the power unit 3. Also, the transmission torque Ti is changeable through adjustment of the idling rotational speed ri. As described above, since the transmission torque Ti is greater than the necessary transmission torque, traveling at the idling rotational speed ri is possible even when the clutch 2 is configured as a centrifugal clutch.

Figure 8:
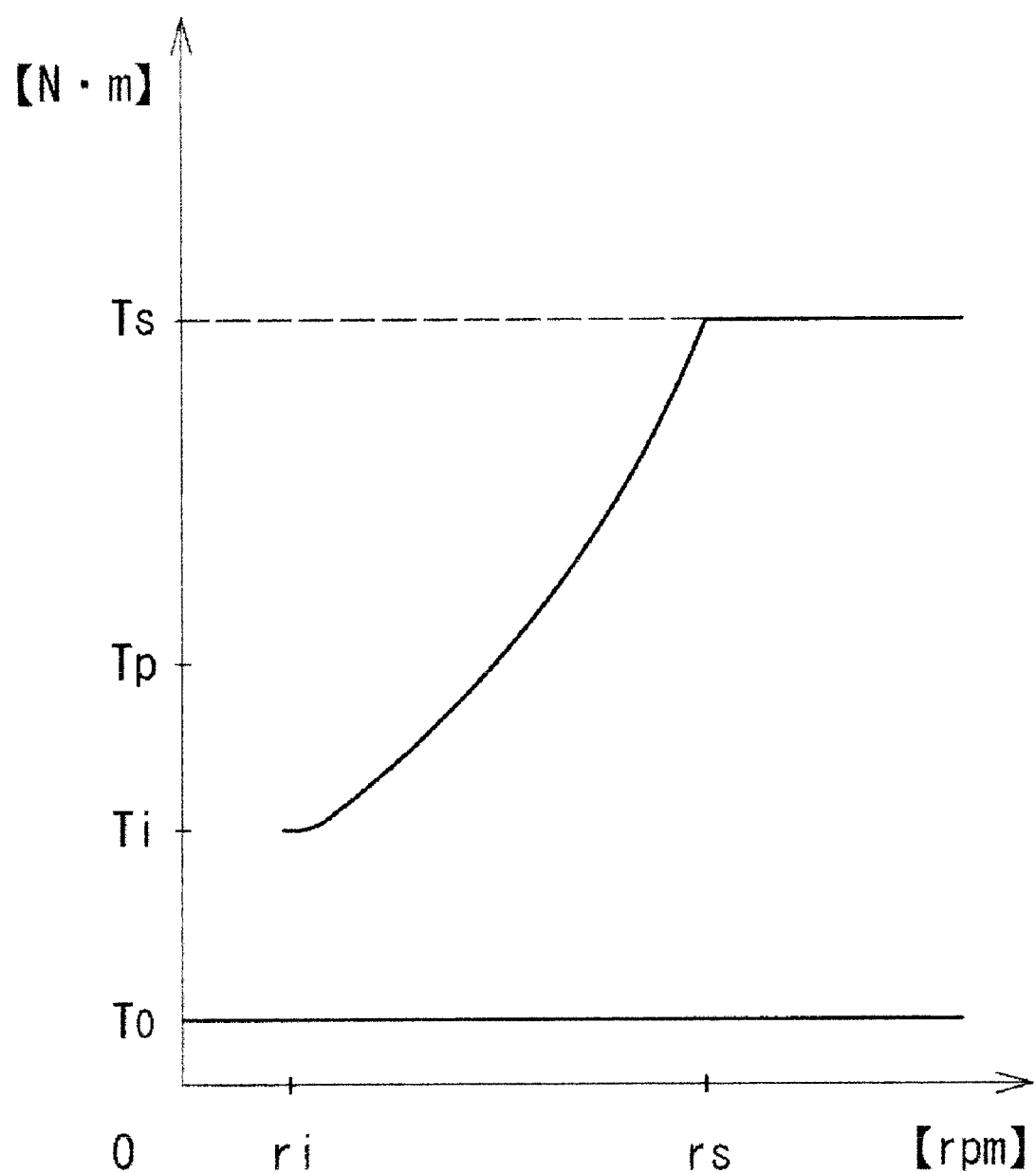
FIG. 8 is a graph showing variations in the transmission torque of the clutch of FIG. 3 during operation of the motorcycle of FIG. 1.

In FIG. 8, the range between zero and the idling rotational speed ri on the horizontal axis (rotational speed of the engine 4) indicates different variations in the transmission torque. The different variations are shown in the case of different order of operations such as, for example, the clutch lever 24 and the shift pedal 27 at the time of starting the engine 4 from its stopped state. In FIG. 8, the variation in the transmission torque in the above-described area is abbreviated. In any case, however, the transmission torque is shown in the range of between T0 and TP in the area described above.

As the rotational speed of the engine 4 is increased to be higher than the idling rotational speed ri, the transmission torque in the clutch 2 is increased corresponding to the rotational speed of the engine. However, as shown in FIG. 7c, the centrifugal movement of the respective roller weights 41 (having received the centrifugal force) is constrained by the shape of the cam surface 81 on the radially outer side of the pressure plate 77. Hence, a leftward pressing force of the pressure plate 77 is applied as a force having a constant magnitude to press the friction plates 64 and the clutch plates 65. The case where the centrifugal movements of the roller weights 41 are constrained—or, more specifically, when the rotational speed of the engine 4 is sufficiently high that the roller weights 41 reach the radially outermost portion of the respective cam surfaces 81 of pressure plate 77—is denoted by rs. In FIG. 8, a transmission torque of the clutch 2 when the engine 4 reaches rotational speed rs is denoted by Ts. Even in the case where the rotational speed of the engine 4 becomes greater than rs, the pressing force of the pressure plate 77 for pressing the friction plates 64 and the clutch plates 65 remains constant. Hence, the transmission torque Ts of the clutch 2 is indicated in the graph of FIG. 8 as constant value.

MODIFIED EXAMPLE 1

In the embodiment described above, the parking brake mechanism 120 utilizes the expansion direction of the coil spring as the direction of the biasing force of the spring 122b. However, the direction of the biasing force of the spring 122b is not limited to the expansion direction. Modified Example 1 will be described hereinbelow with reference to the case where the direction of the biasing force of the spring 122b is altered. In Modified Example 1, the same numerals designate members or portions that exhibit the same effects as those in the above-described embodiment.

Figure 9:
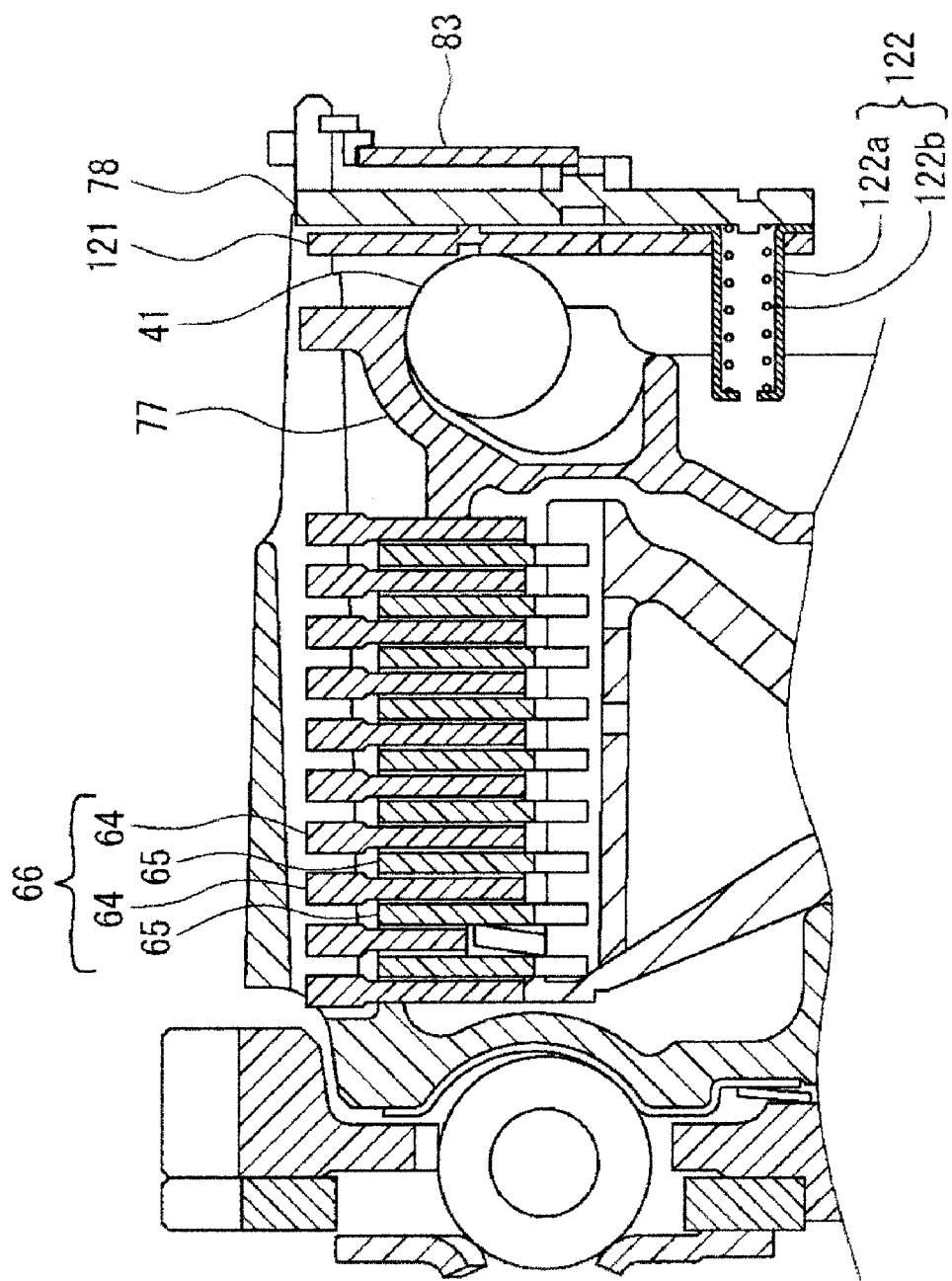
FIG. 9 is an enlarged partial cross-sectional view of a clutch in accordance with an alternative exemplary embodiment.

As shown in FIG. 9, an elastic member 122 of Modified Example 1 is disposed reversely in a left-right direction along the axial direction of the main shaft 33 with respect to the elastic member 122 shown in FIG. 3 or 7. Further, FIG. 9 shows a state of the clutch 2 in which the engine 4 is being driven. In Modified Example 1, the spring holders 122a are fixed not to the roller retainer 78 but to the elastic member retainer 121. Further, the spring 122*b* is fixed not to the elastic member retainer 121 but to the roller retainer 78. While one end of the spring 122*b* is, as described above, fixed to the roller retainer 78, the other end on the opposite side is situated in contact with the tubular head portion of the spring holder 122*a*. The spring holder 122*a* extends through the elastic member retainer 121. Each through-hole (not shown) of the elastic member retainer 121 has a shape analogous to the cross-section of the tubular body of the spring holder 122*a*, for example. The sizes of the respective through-holes are not specifically limited. The size of the respective through-holes can be an arbitrary as long as a function that allows the elastic member retainer 121 to support the elastic member 122, and the elastic member retainer 121 to receive the centrifugal force of the roller weights 41, is maintained. The spring 122*b* is inserted into the interior of the tubular body of the spring holder 122*a*, which is fixed to the elastic member retainer 121, in an expanded state with its length longer than its natural length. More specifically, the spring 122*b* urges the roller retainer 78 leftward with the use of its biasing force in the spring contraction direction. The roller retainer 78 and the elastic member retainer 121 are constantly in contact with each other with a bottom portion of the spring holder 122*a* being sandwiched therebetween. By utilizing the biasing force in the spring contraction direction of the spring 122*b*, the parking brake mechanism 120 brings the roller retainer and the elastic member retainer 121 into contact with the roller weights 41. Further, the parking brake mechanism 120 presses the pressure plate 77 leftward via the roller weights 41, thereby causing pressed-contact of the plate group 66.

In the case where the engine 4 has been started from its stopped state, the roller weights 41 receive a centrifugal force causing them to move centrifugally outward. Further, when the rotational speed of the engine 4 increases, the radially outward movement of each roller weight 41 is constrained by the shape of the corresponding cam surface 81 at the radially outer side of the pressure plate 77. In this event, the roller retainer 78 and the elastic member retainer 121 are both urged leftward by the biasing force of the disc spring 83. Consequently, the pressure plate 77 presses the friction plates 64 and the clutch plates 65 by using a leftward pressing force having a constant magnitude (see FIG. 8).

MODIFIED EXAMPLE 2

In the first embodiment and Modified Example 1 described above, the elastic member 122 used in the parking brake mechanism 120 utilizes a coil spring. However, the elastic member 122 is not limited to utilization of a coil spring. An equivalent operation can be carried out with the elastic member 122 using leaf springs as described below. In Modified Example 2, the same numerals designate members or portions that exhibit the same effects as those in the above-described embodiments.

Figure 10:
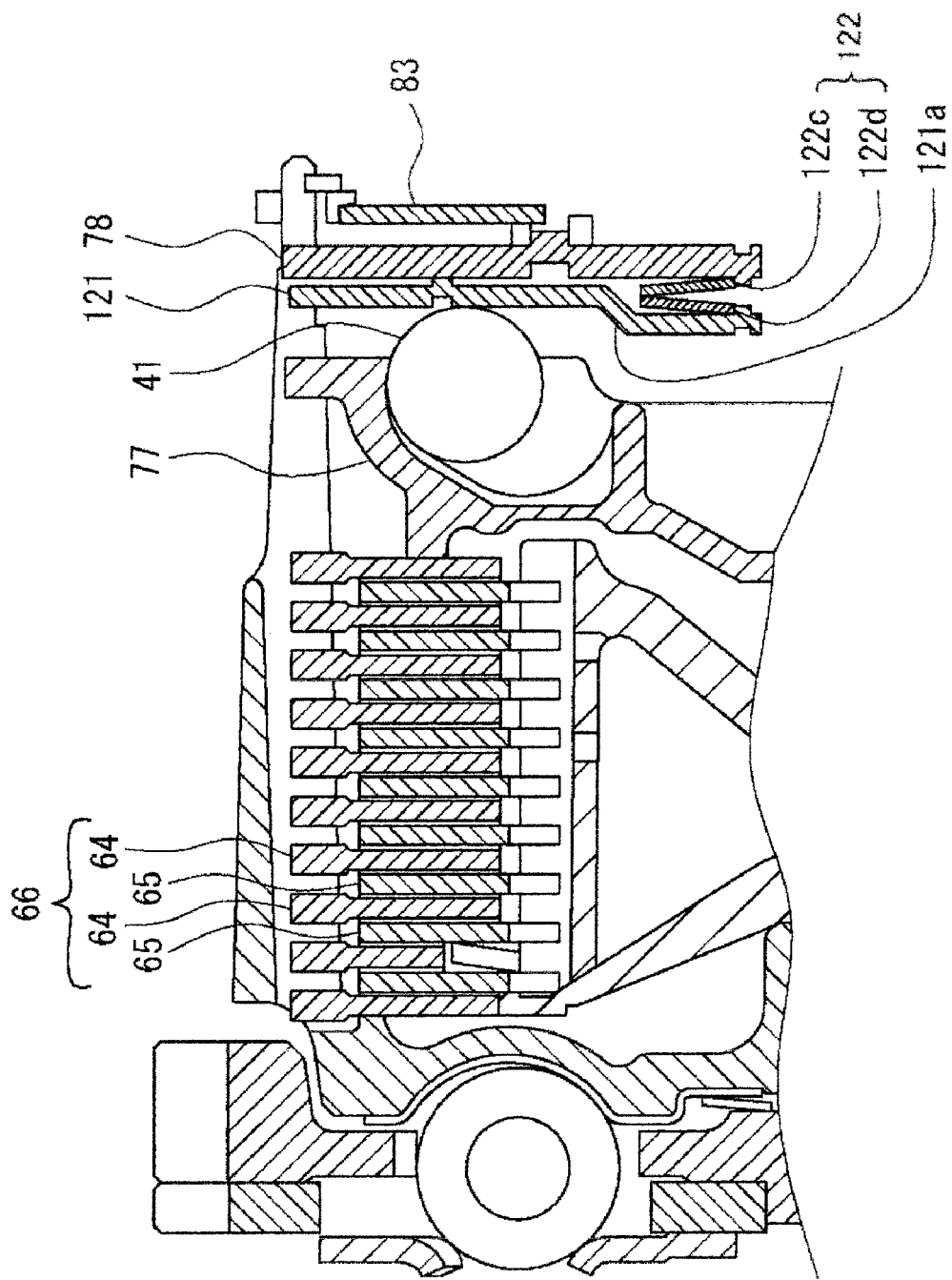
FIG. 10 is an enlarged partial cross-sectional view of a clutch in accordance with another alternative exemplary embodiment.

As shown in FIG. 10, an elastic member 122 in Modified Example 2 is implemented as a set of leaf springs. With the use of a plurality of leaf springs, the configuration is formed so that the friction plates 64 and the clutch plates 65 are brought into contact with each other even when the engine 4 is in a stopped state. FIG. 10 shows a state in which the engine 4 is being driven. Further, a leaf spring 122*c* is fixed to the roller retainer 78. The elastic member retainer 121 includes a bent portion 121*a* so as not to hinder disposition positions of leaf spring 122*c* and leaf spring 122*d*. Leaf spring 122*d* is fixed to one end of bent portion 121*a*, as depicted in FIG. 10. The leaf spring 122*c* and the leaf spring 122*d* collectively generate mutually opposed biasing forces at their ends attached to the roller retainer 78 and the elastic member retainer 121, respectively. The mutually opposed biasing forces at the ends of leaf springs 122*c* and 122*d* are in directions, which tend to push apart the roller retainer 78 from the elastic retainer 12. In other words, the leaf spring 122*c* and the leaf spring 122*d* collectively bias the elastic member retainer 121 leftward, and the leaf spring 122*d* and the leaf spring 122*c* collectively bias the roller retainer 78 rightward. As a result, when the engine 4 is in the stopped state, the elastic member retainer 121 of the parking brake mechanism 120 pushes the pressure plate 77 leftward via the roller weights 41 due to the restoring force of the leaf springs 122*c* and 122*d*, which tends to separate the elastic member retainer 121 from the roller retainer 78.

In the case where the engine 4 has been started from its stopped state, the roller weights 41 centrifugally move outward. Further, when the rotational speed of the engine 4 increases, the radially outward movement of the respective roller weights 41 is constrained by the shape of the respective cam surfaces 81 at the radially outer side of the pressure plate 77. In this event, the leaf springs 122*c* and 122*d* are compressed and the roller retainer 78 and the elastic member retainer 121 both directly receive the leftward biasing force of the disc spring 83. In total, the leaf springs 122*c* and 122*d*, and the disc spring 83 collectively result in a leftward biasing force, which increases in magnitude in accordance with the centrifugal force applied to the respective roller weights 41 and as the roller weights 41 move radially outward on the cam surfaces 81 (see FIG. 8). Further, as shown in FIG. 8, the pressure plate 77 presses the friction plates 64 and the clutch plates 65 by use of a leftward pressing force having a constant magnitude once the radially outward movement of the roller weights 41 is constrained by the respective cam surfaces 81.

Effects of Embodiment

As described above, according to the present embodiment, although the clutch 2 is a centrifugal clutch, the friction plates 64 and the clutch plates 65 can be contacted with each other even when the engine 4 is in a stopped state. Hence, according to clutch 2 of the present embodiment, the torque can be transmitted even when the engine 4 is in a stopped state. As such, at the time of parking in a sloped road, the motorcycle 1 can be stably parked by carrying out a gear input operation without using specific means, such as a parking brake.

Further, according to the present embodiment, the clutch 2 includes elastic member 122 and elastic member retainer 121 in the parking brake mechanism 120. In order that the friction plates 64 and the clutch plates 65 come into contact with each other even when the engine 4 is in a stopped state, the disc spring 83 and the elastic member 122 constantly press by using the biasing force of the springs. Thus, the disc spring 83 and the elastic member 122 constantly bias the pressure plate 77 toward the plate group 66 even when the engine 4 is in a stopped state. Consequently, the motorcycle 1 that exhibits the above-described effects can be provided.

In the present embodiment, the respective springs 122*b* and 122*c* are contained in a spring holder 122*a*—which in the present embodiment comprises the roller retainer 41 and a bent portion 121*a* of elastic member retainer 121—in the compressed state with its length shorter than its natural length. In this event, the pressure plate 77 is pressed by utilizing the force in the expansion direction of the springs 122*b* and 122*c*. In this case, as compared with the case of using the contraction force of the spring 122*b*, an amount of expansion of the springs 122*b* and/or 122*c* to be longer than the natural length thereof does not have to be taken into account. Hence, the respective springs 122b and 122c can be disposed in a predetermined position without including the amount of expansion of the spring 122b to be longer than the natural length thereof. Consequently, gaps related to the disposition of the springs 122b and 122c in the interior of the clutch 2 can be effectively utilized.

According the present embodiment, in the clutch 2, the friction plates 64 and the clutch plates 65 are pressed into contact with each other when the engine 4 is in the stopped state. However, the friction plates 64 and the clutch plates 65 can easily be shifted into the non-contact state. By setting the friction plates 64 and the clutch plates 65 to the non-contact state, the transmission torque of the clutch 2 can be reduced approximately to zero. For example, in a non-centrifugal type multi-plate clutch, the friction plates 64 and the clutch plates 65 are constantly in contact with each other except for the time when the clutch is disengaged. Hence, in the clutch 2, the load on the plate group 66 can be reduced as compared with the case in the non-centrifugal type multi-plate clutch. Further, in the clutch 2, wear of the plate group 66 can be prevented by the reduction of the load on the plate group 66. Further, at the time of traveling after engine has started, a wide transmission torque range including a range obtained by the reduction of the transmission torque can be used. More specifically, since an excessive load is not applied, comfortable traveling can be achieved.

In the present embodiment, the motorcycle 1 includes the clutch lever 24. The motorcycle 1 further includes the power-assist mechanism 200, the sub-clutch 100, and the push mechanism 43. At the time of clutch disengagement by the clutch lever 24, the power-assist mechanism 200 receives torque from the pressure plate 77 and converts the torque into force for moving the pressure plate 77 in the direction of separating the friction plates 64 and the clutch plates 65 from each another. The sub-clutch 100 includes the friction plate 101 that is configured to rotate with the pressure plate 77. The sub-clutch 100 further includes the pressure plates 102 and 103 that receive torque from the friction plate 101 by being press-contacted with the friction plate 101 at the time of clutch disengagement and that move in the predetermined direction with the pressure plate 77. In response to the operation of the clutch lever 24, the push mechanism 43 causes the pressing plates 102 and 103 to be pressed against the friction plate 101. Further, the power-assist mechanism 200 causes reduction of the force necessary for manual engagement or disengagement operation of the clutch 2. Hence, in the motorcycle 1, the engagement or disengagement operation can easily be effected when necessary. Consequently, the transmission torque of the clutch 2 can easily be reduced, and effects described above can be obtained.

According to the present embodiment, the power-assist mechanism 200 comprises a ball cam mechanism. The ball cam mechanism combines the axial operation and the rotational operation. Hence, compared with a unidirectional operation mechanism, the ball cam mechanism is able to obtain a large operational area even in a predetermined limited space. Thereby, compared with the unidirectional operation mechanism, a relatively large drive force can be transmitted. Consequently, use of the ball cam mechanism enables the achievement of an overall space saving for the clutch 2.

In the present embodiment, the ball 43c is provided in the push mechanism 43. With the provided ball 43c, the slide resistance between the short pushrod 43a and the long pushrod 43b in the push mechanism 43 is reduced. Hence, the clutch engagement or disengagement operation from the clutch lever 24 is smoothly transmitted to the pressure plate 77. Consequently, there can be provided a motorcycle including the clutch 2 in which smooth operation is performed at the time of clutch disengagement to thereby exhibit the effects described above.

In the present embodiment, the clutch 2 is a wet multi-plate centrifugal clutch. Since the clutch 2 is of the wet type, friction in the interior of the clutch 2 can be reduced. Further, when the clutch 2 is driven, wear of the interior of the clutch 2 including the plate group 66 and the sub-clutch 100 can be reduced.

As described above, the present invention is useful for centrifugal clutches and motorcycles including a centrifugal clutch.

It is to be clearly understood that the above description was made only for purposes of an example and not as a limitation on the scope of the invention as claimed herein below.

What is claimed:

1. A centrifugal clutch, comprising:
   a drive side rotating body having a first plate and an axis of rotation;
   a driven side rotating body arranged coaxially with the drive side rotating body and having a second plate opposite to the first plate in a predetermined direction along the axis of rotation, the driven side rotating body receiving torque from the drive side rotating body causing it to rotate when the clutch is engaged;
   a pressure plate supported on the drive side rotating body so as to be movable in an axial direction with respect to the drive side rotating body and so as to rotate together with the drive side rotating body, the pressure plate pressing the first plate into the second plate by moving in the predetermined direction, the pressure plate pressing the first plate into the second plate with sufficient force to transmit a portion of the torque of the drive side rotating body from the first plate to the driven side rotating body via the second plate when the engine is in a stopped state; and
   a centrifugal weight that moves outward in a radial direction of the pressure plate according to a centrifugal force generated during rotation of the drive side rotating body, the centrifugal weight increasing the force by which the pressure plate presses the first plate into the second plate as it moves outward in the radial direction.

2. The centrifugal clutch of claim 1, further comprising a plurality of elastic members that urge the pressure plate to press the first plate into the second plate even when the engine is in a stopped state.

3. The centrifugal clutch of claim 1, further comprising:
   a centrifugal weight retainer that rotates with the drive side rotating body, the pressure plate being interposed between the centrifugal weight retainer and the first and second plates;
   a first clutch spring operatively coupled to the centrifugal weight retainer to bias the centrifugal weight retainer in the predetermined direction;
   an elastic member retainer that rotates with the drive side rotating body and is interposed between the pressure plate and the centrifugal weight retainer;
   an elastic member at least partially interposed between the elastic member retainer and the centrifugal weight retainer, the elastic member biasing the elastic member retainer toward the pressure plate so that the elastic member retainer maintains constant contact with the centrifugal weight regardless of the engine state.

4. The centrifugal clutch of claim 3, wherein the elastic member is in a compressed state.

5. The centrifugal clutch of claim 3, wherein:
the elastic member extends through the first clutch spring and the centrifugal weight retainer, the elastic member including a substantially tubular spring holder and a second clutch spring operatively inserted therein; and
one end of the second clutch spring is coupled to the elastic member retainer and the other end is coupled to the interior of the spring holder.

6. The centrifugal clutch of claim 5, wherein the second clutch spring is inserted in a compressed state in the interior of the spring holder, the inserted spring constantly generating a biasing force toward the first and second plates in the predetermined direction.

7. The centrifugal clutch of claim 1, further comprising means for reducing a transmission torque during a disengaged state of the clutch.

8. The centrifugal clutch of claim 7, wherein the means for reducing a transmission torque during a disengaged state of the clutch comprises:
manual means for initiating the engagement or disengagement of the clutch;
a power-assist mechanism that receives torque of the pressure plate at the time of clutch disengagement and converts the torque to a force for moving the pressure plate in the direction causing the first plate and the second plate to separate from each other;
a sub-clutch including a friction plate and a pressing body, wherein the friction plate is configured to rotate with the pressure plate, and the pressing body receives a torque from the friction plate by being press-contacted with the friction plate at the time of clutch disengagement, and moves with the pressure plate in the predetermined direction; and
a push mechanism that is operated through the manual clutch means to thereby move the pressing body to an opposite direction with respect to the predetermined direction.

9. The centrifugal clutch of claim 8, wherein the power-assist mechanism is configured as a ball cam mechanism.

10. The centrifugal clutch of claim 8, wherein the push mechanism includes a ball.

11. The centrifugal clutch of claim 4, wherein the elastic member comprises a coil spring.

12. The centrifugal clutch of claim 4, wherein the elastic member comprises one or more leaf springs.

13. The centrifugal clutch of claim 1, further comprising:
a centrifugal weight retainer that rotates with the drive side rotating body;
a first spring operatively coupled to the centrifugal weight retainer, the first spring biasing the centrifugal weight retainer toward the first and second plates;
an elastic member including a substantially tubular spring holder and a second spring operatively inserted therein in an expanded state, the second spring being coupled at one end to the centrifugal weight retainer and at the other end to the interior of the spring holder; and
an elastic member retainer that rotates with the drive side rotating body and is operatively disposed between the centrifugal weight and the centrifugal weight retainer, the elastic member retainer being in constant contact with the centrifugal weight regardless of the engine state, wherein the spring holder extends through the elastic member retainer and is fixed thereto.

14. A motorcycle including the centrifugal clutch of claim 1.

15. The motorcycle of claim 14, wherein the centrifugal clutch is of the wet multi-plate type.

* * * * *